United States Patent
Wilkins

(10) Patent No.: US 12,205,370 B2
(45) Date of Patent: Jan. 21, 2025

(54) METHODS AND SYSTEMS FOR PRE-OPTIMIZING INPUT DATA FOR AN OCR ENGINE OR OTHER COMPUTER-IMPLEMENTED ANALYSIS PROCESS

(71) Applicant: Ian Jeffrey Wilkins, Boulder, CO (US)

(72) Inventor: Ian Jeffrey Wilkins, Boulder, CO (US)

(*) Notice: Subject to any disclaimer, the term of this patent is extended or adjusted under 35 U.S.C. 154(b) by 924 days.

(21) Appl. No.: 17/319,922

(22) Filed: May 13, 2021

(65) Prior Publication Data
US 2021/0365836 A1 Nov. 25, 2021

Related U.S. Application Data

(60) Provisional application No. 63/024,848, filed on May 14, 2020.

(51) Int. Cl.
| | |
|---|---|
| *G02B 27/01* | (2006.01) |
| *G06F 18/21* | (2023.01) |
| *G06F 18/22* | (2023.01) |
| *G06N 20/00* | (2019.01) |
| *G06T 3/18* | (2024.01) |
| *G06V 20/20* | (2022.01) |

(Continued)

(52) U.S. Cl.
CPC ......... *G06V 20/20* (2022.01); *G02B 27/0172* (2013.01); *G06F 18/217* (2023.01); *G06F 18/22* (2023.01); *G06N 20/00* (2019.01); *G06T 3/18* (2024.01); *G06V 20/62* (2022.01); *G06V 30/10* (2022.01); *G02B 2027/0114* (2013.01); *G02B 2027/0134* (2013.01)

(58) Field of Classification Search
CPC ........ G06V 20/20; G06V 20/62; G06V 30/10; G02B 27/0172; G02B 2027/0114; G02B 2027/0134; G02B 27/0018; G02B 27/1013; G02B 27/141; G06F 18/217; G06F 18/22; G06N 20/00; G06T 3/18
See application file for complete search history.

(56) References Cited

U.S. PATENT DOCUMENTS

| | | | |
|---|---|---|---|
| 2020/0027198 A1* | 1/2020 | Vogels | G06F 18/214 |
| 2020/0065989 A1* | 2/2020 | Bai | G06N 3/045 |
| 2022/0044094 A1* | 2/2022 | Zheng | G06N 3/082 |

* cited by examiner

*Primary Examiner* — Matthew C Bella
*Assistant Examiner* — Andrew B. Jones
(74) *Attorney, Agent, or Firm* — Miller Law Group, PLLC

(57) ABSTRACT

Systems and methods for computer-implemented pre-optimization of input data before further processing thereof by a computer-implemented analyzation process, such as optical character recognition (OCR). A cooperative model is employed that combines one or more supervised-learning based inspector sub-models, and one or more filter sub-models that operating in series with the inspector sub-model (s). The inspectors first receive the input data and calculate one predicted transformation parameters then used to perform transformations on the input data. The inspector-transformed data is then passed to the filters, which derive respective convolution kernels and apply same to the inspector-transformed data before passing same to the OCR or other analyzation process. The inspectors may be pretrained with different training data. For OCR, the model is trained on minimization of normalized edit distance, the inspectors apply initial warping transformations to text images, followed by application of filtering transformations and input to the OCR engine.

20 Claims, 12 Drawing Sheets

(51) Int. Cl.
*G06V 20/62* (2022.01)
*G06V 30/10* (2022.01)

Pre-Train + Primary Cooperative Train Scheme

METHODS AND SYSTEMS FOR PRE-OPTIMIZING INPUT DATA FOR AN OCR ENGINE OR OTHER COMPUTER-IMPLEMENTED ANALYSIS PROCESS

CROSS-REFERENCE TO RELATED APPLICATIONS

This application claims benefit under 35 U.S.C. 119(e) of U.S. Provisional Patent Application 63/024,848, filed May 14, 2020, the entirety of which is incorporated herein by reference.

FIELD OF THE INVENTION

The present invention relates generally to the field of machine learning, and more particularly to training and use of a computer-implemented model for pre-processing input data destined for a subsequent computer-implemented analysis, in a manner trained to optimize the resultant performance accuracy thereof, thereby denoting an improvement to the computer(s) running said analysis.

BACKGROUND

The accuracy of Optical Character Recognition (OCR) is dependent on the OCR engine used, the quality of the input image, and the content of the text to be extracted. Many commercial Optical Character Recognition (OCR) products allow minimal manipulation of the underlying engine, and provide limited interpretability of the underlying model; that is, many commercial OCR solutions are black boxes. Errors in black-box OCR can be corrected with two main classes of action: improvements to the input image, or corrections to output text. Improvements to input images typically involve recapturing the image, or post-capture processing when recapturing an image is infeasible or alterations to the capture environment are impossible [5]. In the case of legacy datasets or restrictive capture environments, input image improvements rely on transformations to the captured image [3]. Corrections to output text become beneficial when some text is recoverable from an image, and a known language and subject matter are being corrected [1]. When the language and subject matter are known, some assumptions regarding spelling, grammar, and vocabulary are granted [7]. These assumptions are not necessarily granted when correcting strings like model/serial numbers or arithmetic. Although there is a latent structure to all model/serial numbers and expressions/formulae, such a structure is often not published in the case of model/serial encoding schemes, or would require a model to learn field/industry specific latent spaces [8]. Many of the benefits of output text correction are reduced or eliminated when the target text is not of a known latent space or structure.

The limitations in pre-capture alteration and output text correction demonstrate a clear and present need for a way to maximize the efficacy of OCR through post-capture transformation of captured images. Though the present invention was conceived and developed with this aim in mind, it will be appreciated from the following disclosure that the inventive systems and methods disclosed herein can also be put to beneficial use in other applications.

SUMMARY OF THE INVENTION

According to one aspect of the invention, there is provided a system for computer-implemented pre-optimization of input data before further processing thereof by a computer-implemented analyzation process, said system comprising:
one or more non-transitory computer readable media having embodied therein computer executable instructions for execution by one or more computer processors connected to said one or more non-transitory computer readable media to perform the following operations:
provide said input data as input to one or more supervised-learning based inspector sub-models that have been trained to calculate one or more predicted transformation parameters for one or more transformations to be applied to said input data, and, through execution of said one or more supervised-learning based inspector sub-models, acquiring said one or more predicted transformation parameters;
trigger execution of said one or more transformations on said input data using said one or more predicted transformation parameters acquired from said one or more inspector sub-models, thereby deriving inspector-transformed input data;
provide said inspector-transformed input data as input to one or more filter sub-models that have been trained to derive one or more convolution kernels to be applied to said inspector-transformed input data, and, through execution of said one or more filtering sub-models, acquiring said one or more convolution kernels; and
trigger application of one or more convolution kernels to the inspector-transformed input data, thereby deriving inspector-and-filter-transformed input data for input to said computer-implemented analyzation process to improve resultant performance thereof.

According to another aspect of the invention, there is provided a computer-implemented method for pre-optimizing input data before further processing thereof by a computer-implemented analyzation process, said method comprising:
by a computing system comprising one or more computer processors and one or more non-transitory computer readable media storing thereon statements and instructions executable by said one or more computer processors:
receiving said input data;
providing said input data as input to one or more supervised-learning based sub-models that have been trained to calculate one or more predicted transformation parameters for one or more transformations to be applied to said input data;
executing said one or more supervised-learning based inspector sub-models, and thereby calculating said one or more predicted transformation parameters;
performing said one or more transformations to said input data using said one or more predicted transformation parameters calculated by said one or more supervised-learning based inspector sub-models, and thereby deriving inspector-transformed input data;
providing said inspector-transformed input data as input to one or more filter sub-models that have been trained to each derive a respective convolution kernel to be applied to said inspector-transformed input data; and
filtering the inspector-transformed input data using the respective convolution kernels derived by the one or more filter sub-models, thereby deriving filter-transformed input data for input to said computer-implemented analyzation process to improve resultant performance thereof.

According to yet another aspect of the invention, there is provided a method of training the sub-models of the system recited in claim 1, said method comprising:

running filter-training data through the one or more inspector sub-models to derive inspector-transformed filter-training data;

running said inspector-transformed filter-training data through the one or more filter sub-models, thereby deriving filter-transformed filter-training data;

inputting both said filter-transformed filter-training data and said inspector-transformed filter-training data to said computer-implemented analyzation process, and deriving therefrom filter-affected resultant data derived from the filter-transformed filter-training data and comparative filter-unaffected resultant data derived from the inspector-transformed filter-training data;

calculating:
 a first distance metric between said filter-affected resultant data and targeted resultant data that is representative of an ideal outcome of the further computer implemented analysis; and
 a second distance metric between said comparative filter-unaffected resultant data and said targeted resultant data; and normalizing said first distance metric against said second distance metric, and based at least partly thereon, assessing performance of the one or more filter sub-models, and updating said one or more filter sub-models based on an assessed performance thereof.

BRIEF DESCRIPTION OF THE DRAWINGS

One embodiment of the invention will now be described in conjunction with the accompanying drawings in which.

DETAILED DESCRIPTION

The accuracy of Optical Character Recognition (OCR) is dependent on the OCR engine used, the quality of the input image, and the content of the text to be extracted. When an OCR engine is a black-box, image recapture is infeasible, and the text to be extracted is not of a natural language, few options exist to improve OCR performance. In view of this, Applicant has developed a novel solution: employing machine-learning of image transformations that minimize edit distance between the OCR extracted text and the known true text within the training image, by training the model on edit distance improvement between original and model-transformed image. Using Levenshtein distance between true text and OCR extracted text as the raw edit distance metric, a comparative normalization scheme was developed to normalize for differences in input image distortion—to measure edit distance improvement. Improvement and raw edit distance were used in conjunction to interpret transformation outcomes. Transformation outcomes were mapped to consequences by a pseudo-policy; outcomes were mapped to values that could be used in a standard loss function and update scheme to simulate the reward/penalty structure of reinforcement learning. Corrective transformations were categorized as warping or filtering. Specialized sub-models were developed to learn each category of transformation: Inspectors—to predict corrective warp parameters, and filters—to learn corrective filter kernels.

One tested working embodiment was trained and tested on distorted text images generated from a corpus of true text strings, where the parameter of each applied distortion was chosen uniformly at random. The transformations produced a significant (p≈0.003) improvement in edit distance. The mean edit distance improvement was 9.3 characters, for true text strings of mean length 10.6 characters. 27.3% of transformed images produced an OCR output that exactly matched the true text, 47.1% produced an output within 1 character edit, and 79.0% of transformed images were within 3 character edits; compared to 0.1%, 0.1%, and 0.6% respectively, for the original images.

Figure 1:
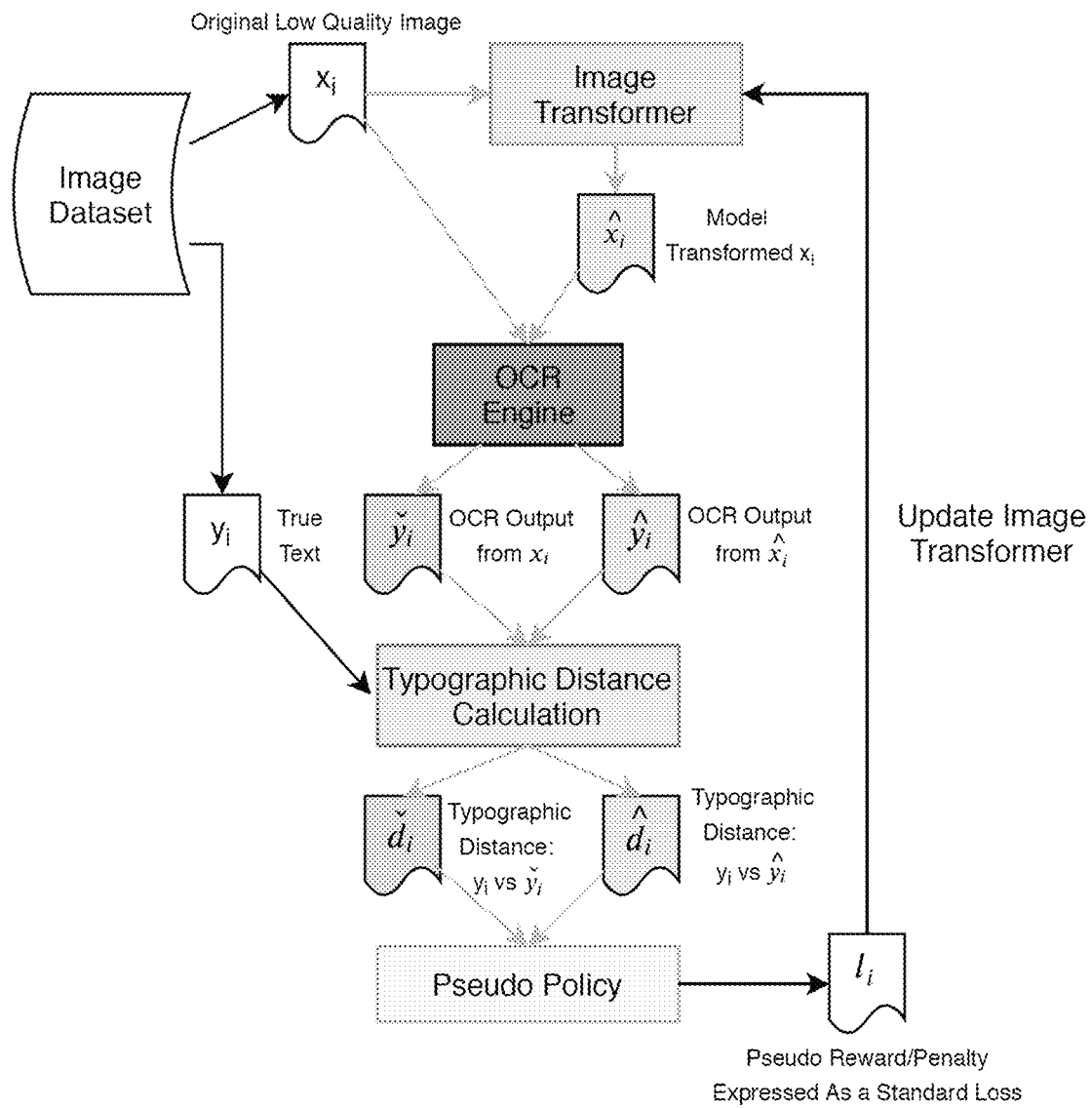
FIG. 1 is a block diagram schematically illustrating a training regime for a machine learning model that performs post-capture image transformation on captured images before input thereof to an OCR engine.

FIG. 1 schematically illustrates a process for training an image-transformation model that, once trained, is useful for preoptimizing text images prior to input thereof to an OCR engine. In order to evaluate the performance of OCR on a given input, comparison is made of the output of the OCR engine against known text within an image.

Let ocr(o; $x_i$) symbolize a call to OCR engine o with input image $x_i$;

$y_i$ symbolize the known text within $x_i$; and $d(\hat{y}_i, y_i)$ symbolize the typographic distance between input string $\hat{y}_i$ and target string $y_i$.

The performance of OCR engine o on input image $x_i$ is evaluated as through $d(ocr(o; x_i), y_i)$. There are many choices for what typographic distance, d, should be used, and different metrics produce different behaviors in the measurement of typographic distance. Edit distance is a subset of typographic and sequence distance that measures the sum of costs of edit operations required to transform an input string/sequence into a target string/sequence. The costs of operations can be uniform: an unweighted edit distance, specified by edit type: different costs for insertion, deletion, and substitution, or specified by edit content: different costs based on the source and target characters. Unweighted Levenshtein distance is calculated as the sum of single character insertions and deletions necessary to align one sequence to another. Unweighted Levenshtein distance was chosen for the tested working embodiment because it does not include substitutions, thereby reducing the edit distance to a simple count of single character edit operations. Functionality was built into the model of the test working embodiment for weighted Levenshtein distance, but was not put to you in the non-limiting example disclosed herein.

Image warping is any transformation that adjusts the location of existing pixels. Warping may be applied directly to a captured image, or approximated by altering the location/orientation of the camera and target—e.g. rotating the camera to approximate rotating an image. In the context of the tested working embodiment, corrective warping is any transformation that adjusts the location of pixels for the purpose of improving OCR performance. Common corrections via warping include (but are not limited to):

Rotation: Rotate image so that lines of text are horizontal.

Perspective: 4-Point perspective transform to restore parallelism of lines of text, and size uniformity among characters Translation: Translate image to ensure text has padding (characters on the edge of an image are often harder to extract), and is near the center of the image frame.

Reflection: Restore text that has been mirrored by mirrors or lenses.

Shear: Improve recognition of italic text, and correct for text printed on elastic surfaces.

Scale: Alter the size of text for uniform sizing across a document.

Non-uniformity of pixel movement is one of the greatest challenges in corrective warping process; e.g. when rotating an image, the pixels farthest from the center of rotation move substantially, while the pixels near the center of rotation move much less. As such, training a model to perform a warping process through convolution is both difficult, and requires a very deep network. However, all of the above listed warping transformations can be performed using well defined closed-form algorithms. Accordingly, the learning task can be simplified to learning the transformation parameters rather than learning the transformative process itself—e.g. corrective rotation can be simplified to learning the angle and center of rotation needed to correct the image rather than learn the set of kernels necessary to approximate a rotation transformation.

Image filtering is any transformation that adjusts the color/intensity of pixels. Filtering may be applied to a captured image, or approximated by altering the lens of a camera or the lighting of the capture environment—e.g. adding a blue light filter to optics to make the colors warmer. In the context of the tested working embodiment, corrective filtering is any transformation that adjusts the color/intensity of pixels for the purpose of improving OCR performance. Common corrections via filtering include (but not limited to):

Smoothing: Reduce high-frequency noise obscuring text.

Color Balancing: Adjust brightness, contrast, saturation, and hue to intensify and highlight text.

Gradient Mapping: Using Sobel, Prewit, Laplacian of Gaussian, etc. . . . kernels to highlight potential edges and corners in text.

Filtering processes ultimately reduce to the application of a convolution kernel across an image. As such, the learning task for a filtering operation directly maps to learning the weights of a convolution kernel.

Unlike reinforcement learning, where the aim is achievement of an end goal in a definable environment (e.g. the game of chess, in which the game board and game pieces denote an environment that can be queried for its current state and compared against known rules of game play to conclude when an definitive end-state has been reached), image transformation learned through OCR performance is not easily defined as an environment because confirmed achievement of the end goal of the correction process is only possible by comparing the OCR output against true text; i.e. progress is measured by reductions in the edit distance between OCR output and true text. As such, it is not possible for the model to query an environment for the current state outside of training. Instead, a different approach was developed that enacts a reward and penalty system through traditional loss functions, as schematically illustrated in FIG. 1. More particularly, transformation outcomes were mapped to consequences by a pseudo-policy; outcomes were mapped to values that could be used in a standard loss function and update scheme to simulate the reward/penalty structure of reinforcement learning.

With reference to FIG. 1, let:

$\hat{x}_i$ symbolize the output of the image transformer given input image $\square_i$ symbolize ocr(o; $x_i$); the output of OCR engine o on the original (pre-transformation) input image $x_i$ $\hat{y}_i$ symbolize ocr(o; $\hat{x}_i$); the output of OCR engine o on the transformed image $\hat{x}_i$ $y_i$ symbolize the known text within $x_i$.

$d(\breve{\square}_i; y)$ symbolize the edit distance between input string $\square_i$ and target string $y_i$; i.e. the edit distance between the known text within $x_i$ and the text extracted by OCR engine o from $x_i$ $d(\hat{y}_i; y_i)$ symbolize the edit distance between input string $\hat{y}_i$ and target string $y_i$; i.e. the edit distance between the known text within $x_i$ and the text extracted by OCR engine o from $\hat{x}_i$ Not all input images, $x_i$, have the same degree and type of distortion, nor the same length of true text, $|y_i|$. Thereby, in a training set of n images, $\neg(\forall i \in \{1, \ldots, n\} \; \forall j \in \{1, \ldots, n\} \; (d(\breve{y}_i, y_i) = d(\breve{y}_j, y_j)))$; not all input images have the same edit distance between OCR output and true text. Using edit distance alone does not fairly evaluate model performance; a fairer metric evaluates the degree of improvement in OCR performance due to the model's transformations; i.e. normalize $d(\hat{y}_i; y_i)$ by calculating the difference between $d(\hat{y}_i; y_i)$ and $d(\square_i; y_i)$, thereby determining a change in resulting edit distance that is attributable to the performed transformations. Let $d(\breve{\square}_i; y_i) - d(\hat{y}_i; y_i)$ be called an 'improvement score'; where a negative score means the transformation let to an OCR output that was farther from the true text, and a positive score means the transformation led to an OCR output that was closer to the true text.

Using the forgoing comparative normalization scheme, there are five possible outcomes with respect to improvement and edit distance between true text and the OCR output of the transformed image.

Improvement==0, Edit Distance==0: (I0E0)
Transformation did not improve OCR performance, but perfect OCR performance was still achieved. Thus, the input image was already perfect, and transformation did not harm performance.

Improvement==0, Edit Distance>0: (I0E+)
Transformation did not improve OCR performance, and perfect OCR performance was not achieved. Thus, the input image was distorted, and transformation neither corrected nor worsened the distortions.

Improvement>0, Edit Distance==0: (I+E0)
Transformation improved OCR performance, and perfect OCR performance was achieved. Thus, the input image was distorted, and transformation completely corrected the distortion.

Improvement>0, Edit Distance>0: (I+E+)
Transformation improved OCR performance, but perfect OCR performance was not achieved. Thus, the input image was distorted, and transformation corrected some, but not all, distortion.

Improvement<0, Edit Distance==0: (I-E0)
Not a possible outcome. Since edit distance will always be positive, and a negative improvement score means transformation increased the edit distance, edit distance==0 and improvement<0 means that the edit distance was increase to 0, which is not possible since edit distance cannot be less than 0.

Improvement<0, Edit Distance>0: (I-E+)
Transformation worsened OCR performance. Thus, the input image may or may not have been distorted, and transformation worsened/added distortion.

A structure of consequences for the five possible outcomes was designed to map the five outcomes to a score that can be used in a classic loss and update scheme to mimic some qualities of penalties and rewards from reinforcement learning. In abstract, consequences must consider improvement, deterioration, and stasis.

Improvement is transformation that increases $d(\breve{y}_i; y_i) - d(\hat{y}_i; y_i)$. Not all improvement receives the same consequence. The ideal improvement of a distorted input image is that which leads to $d(\hat{y}_i; y_i) = 0$; let this result be called 'perfect improvement', and other improvements be 'partial improvement'. When training a model, perfect improvement of a distorted image is ideal behavior, and should have a loss of 0. Partial improvement is still correct behavior, especially given some images may not be perfectly correctable. Therein, partial improvement should have a small but non-zero loss.

Deterioration is transformation that decreases $d(\breve{y}_i; y_i) - d(\hat{y}_i; y_i)$. Similar to improvement, not all deterioration is created equal; different distortions added by the model have different degrees of effect on edit distance. All deterioration should receive a large loss, but an additional term should be added and scaled my the magnitude of $d(\breve{y}_i; y_i) - d(\hat{y}_i; y_i)$; i.e. all deterioration is punished, but additional punishment is given based on the magnitude of the effect on edit distance.

Stasis is transformation where $d(\breve{y}_i; y_i) = d(\hat{y}_i; y_i)$. In the case of an original image that produces a perfect OCR output, i.e $x_i/d(\breve{y}_i; y_i) = 0$, stasis is ideal behavior, let this result be called 'perfect stasis', and other stasis be 'imperfect stasis'. Perfect stasis should receive a loss of 0. When $d(\hat{y}_i; y_i)$ is high, and $d(\breve{y}_i; y_i) = d(\hat{y}_i; y_i) = 0$, both $x_i$ and $\hat{x}_i$ are heavily distorted, and imperfect stasis provides little to no information about model performance. It may be the case that OCR fails to extract any text from both $x_i$ and $\hat{x}_i$; one image may be better, but the difference is not significant enough to result in successful character extraction. Conversely, it may be the case that OCR extracts an excess of characters from both $x_i$ and $\hat{x}_i$; one image may have more correct characters, but both have enough additional characters that improvement/distortion is masked. Lastly, it may be the case that OCR extracts the correct number of characters from $x_i$ and $\hat{x}_i$, but transformation either fails to improve $x_i$, or leads to an equal degree of distortion of other aspects of character recognition. Imperfect stasis is common behavior early in training, on heavily distorted input images; in both cases, the transformation of the model is insufficient to effect the edit distance. Imperfect stasis should receive a loss less than deterioration, but greater than imperfect improvement.

In view of this, the particular pseudo policy employed in the tested working is described as follows, purely as a non-limiting example. In this example, the minimum consequence assigned is 0.001 if improvements are made, and 0 if no improvements were made. If the improvement is positive, but the edit distance is non-zero, the penalty assigned was a factor of 0.001. If the improvement between inspector and filter is negative, the improvement score is multiplied by 3 and added to the base consequence. In other words, negative improvement was penalized by a factor of 3. If no improvement occurs, the improvement score is multiplied by 0.25 and added to the base consequence. In other words, zero improvement is penalized by a factor of 0.25. Implementation of this non-limiting example is demonstrated as follows:

```
def policy(improvements, edit_dists):
    #Positive Improvement
    #The edit distance between the true text and the OCR
        output of the
    #filter-transformed image is less than the edit distance
        between true
    #text and OCR output of the inspector-transformed
        image.
    base_consequences=(improvements>0)*0.001
    #Negative Improvement:
    #The edit distance between the true text and the OCR
        output of the
```

```
#filter-transformed image is greater than the edit distance
    between true
#text and OCR output of the inspector-transformed
    image.
base_consequences=(improvements<0)*3+base_conse-
    quences
#No Improvement.
base_consequences=(improvements==0)*0.25+base_c-
    onsequences
#If the edit distance between the text extracted from the
#filter-transformed image and the true text==0, then one
    of 2 cases
#occurred:

#1. The inspector completely corrected the image on its
    own (leading
#to perfect OCR), and the filter did not perform a trans-
    formation
#that harmed OCR performance.
#2. The filter improved the inspector-transformed image,
    leading to
#perfect OCR performance.
#In case 1, the filter did not harm a good image. In case
    2, the filter
#helped a bad image. In either case, the filter should not
    be penalized.
#Thus, the consequence vector will be adjusted to have a
    penalty of 0
#when the edit distance is 0.
zero_edit=edit_dists.apply_(lambda d: 0 if d==0 else 1)
adj_consequences=base_consequences*zero_edit
#Weight consequences for negative improvement (when
    the filter-transformed
#image has a greater edit distance than the inspector-
    transformed image),
#using the difference between the edit distances of the
    filter/inspector
#transformed images.
weights=((improvements/−10)*(improvements<0))+tor-
    ch.ones(improvements.size( ))
weighted_consequences=adj_consequences*weights
return(weighted_consequences)
```

Warping transformations are the most computationally expensive to learn through convolution. Although it is possible to approximate common warping transformations through convolution, reasonable approximations require very deep networks, and excessive computational power. Many warping transformations have well defined solutions, and their learning task can be simplified to learning a warp parameter for a closed-form transformation; e.g. learning the center and angle of rotation to inverse map rotated pixel coordinates. Furthermore, the separability of different warping operations suggests that models learning warp parameters can be trained asynchronously and independently; a rotation model could be trained independent of translation, scale, shear, perspective, etc. . . . and not be limited to the same dataset.

Filtering transformations are analogous to the process of convolution; learning a filter kernel maps directly to the process of learning a convolution kernel. Therein, the process of learning a set of filter kernel translates well to the task of learning a set of convolution kernel in a convolutional neural network (CNN). Unlike warping, learning filters through convolution is relatively efficient.

Warping and filtering benefit from different learning tasks, and combining both into a single CNN is neither computationally nor data efficient. To improve the computation and data efficiency of the image transformer, and better structure the learning task, the image transformer employed in the tested working embodiment contains separate classes of sub-models for warping and filtering: inspectors, and filters. The inspector sub-models and filter sub-models are cooperatively integrated together to form what is referred to herein as a cooperative model.

Figure 2:
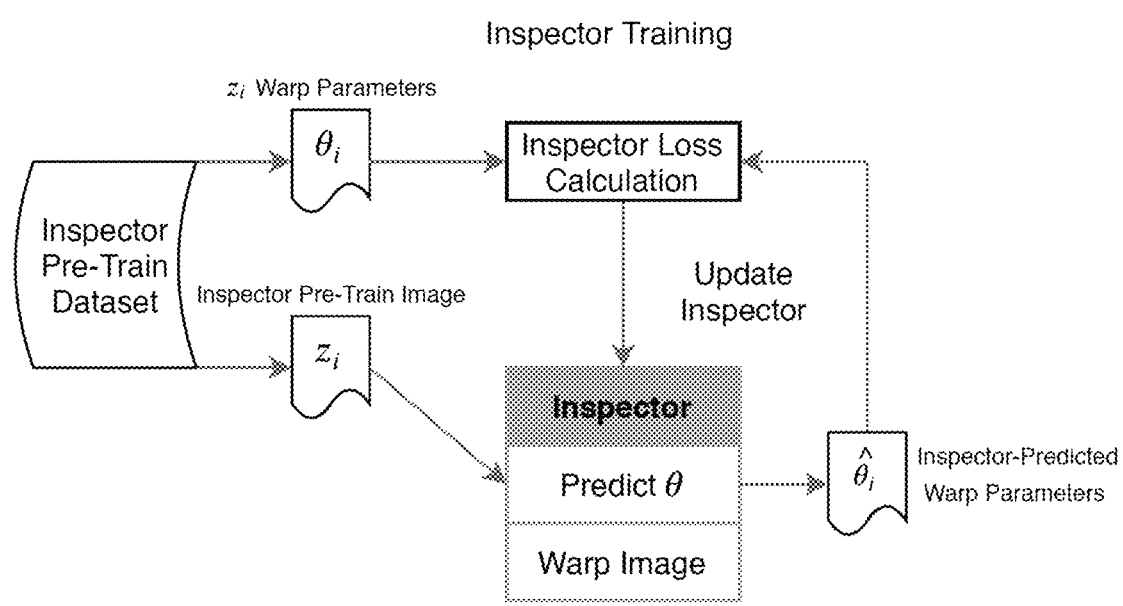
FIG. 2 is a block diagram schematically illustrating a training regime for an isolated inspector sub-model responsible particularly for a closed-form transformation of the captured images.

Referring to FIG. 2, in the context of the tested working embodiment, the inspectors are sub-models devoted to learning one or more parameters of a particular warping transformation. In this particular example, the inspector was devoted to a rotation transformation, and trained to learn a singular parameter thereof, specifically the angle of rotation, while the other rotation parameter (center of rotation) was a treated as predefined constant, particularly the center point of the image. Inspectors are supervised learning models that receive an image, $z_i$, as an input to predict the value of the warp transformation parameter, $\hat{\theta}_i$, needed to correct $z_i$. The predicted parameter, $\hat{\theta}_i$, is compared against the true parameter, $\theta_i$, to update the inspector. The inspector learns to correct a single warp transformation, and the inspector object has a built-in closed-form transformation for the particular warp it learns, displayed as the method 'Warp Image'.

There is no requirement that any training data be shared between different sub-models. As such, each inspector can receive a different dataset, and be trained independently before use in conjunction with other sub-models. The ability to asynchronously pre-train is a beneficial component to inspector architecture since inspectors require an additional $\theta_i$ parameter that is neither utilized by, nor provided in the training data of, the filter sub-models. Therein, the training data for the inspector does not need to be labeled with true text, and the training data provided to the filter sub-models does not need to be labeled with $\theta_i$.

Figure 3:
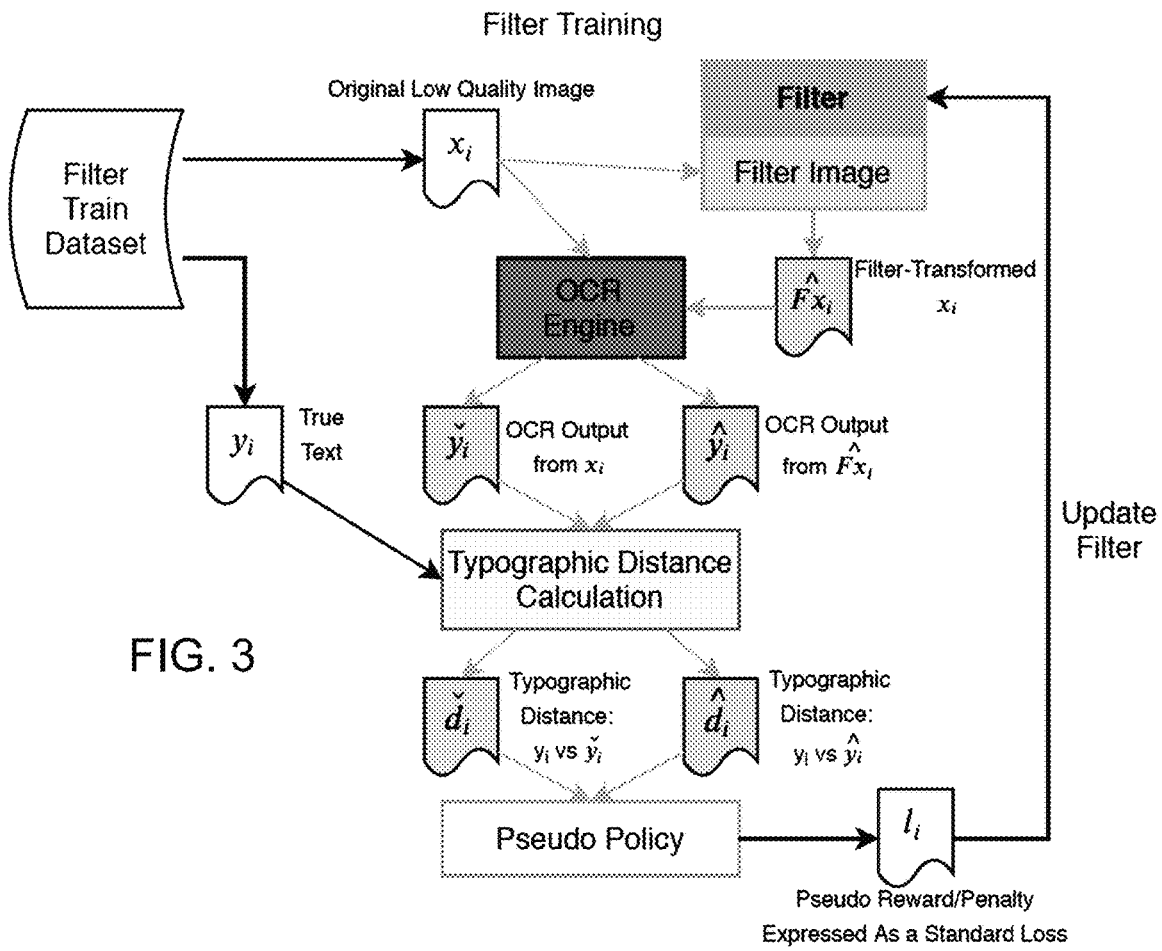
FIG. 3 is a block diagram schematically illustrating a training regime for an isolated filter sub-model responsible particularly for filtering of the inspector-transformed images before input of the resulting filtered images to the OCR engine.
Figure 4:
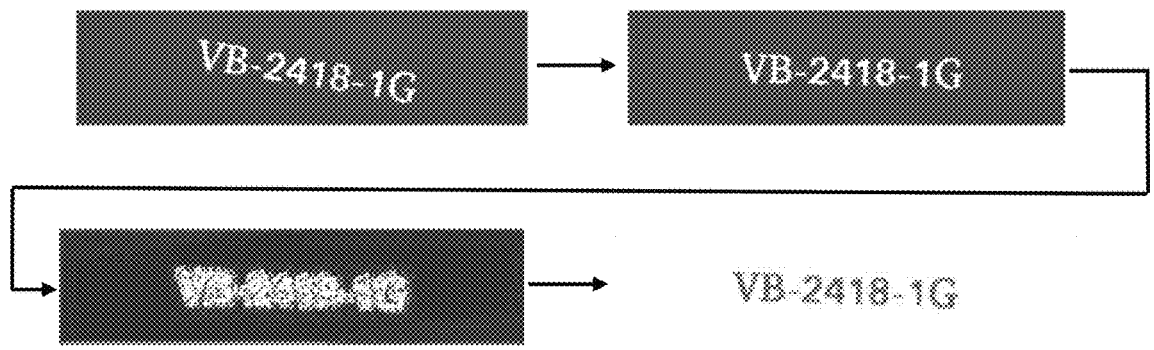
FIG. 4 shows, in a sequential order denoted by the illustrated arrow, an original image, an inspector-transformed image near inspector convergence, a filtered image near inspector convergence, and a filtered image post inspector convergence.

Referring to FIG. 3, in the context of the tested working embodiment, the filters are sub-models devoted to learning a set of kernels to filter an input image using convolution. Filter training in isolation is identical to the comparative normalization scheme discussed previously in relation to FIG. 1; the filter transforms an input image, $x_i$, to produce $\hat{x}_i$. $x_i$ and $\hat{x}_i$ are run through OCR to produce the extracted text strings $\square_i$ and $\hat{y}_i$, respectively. The edit distances $d(\square_i; y_i)$ and $d(\hat{y}_i; y_i)$ are calculated and the difference $d(\square_i; y_i)-d(\hat{y}_i; y_i)$ is passed to a pseudo-policy for a consequence to update the model.

Figure 5:
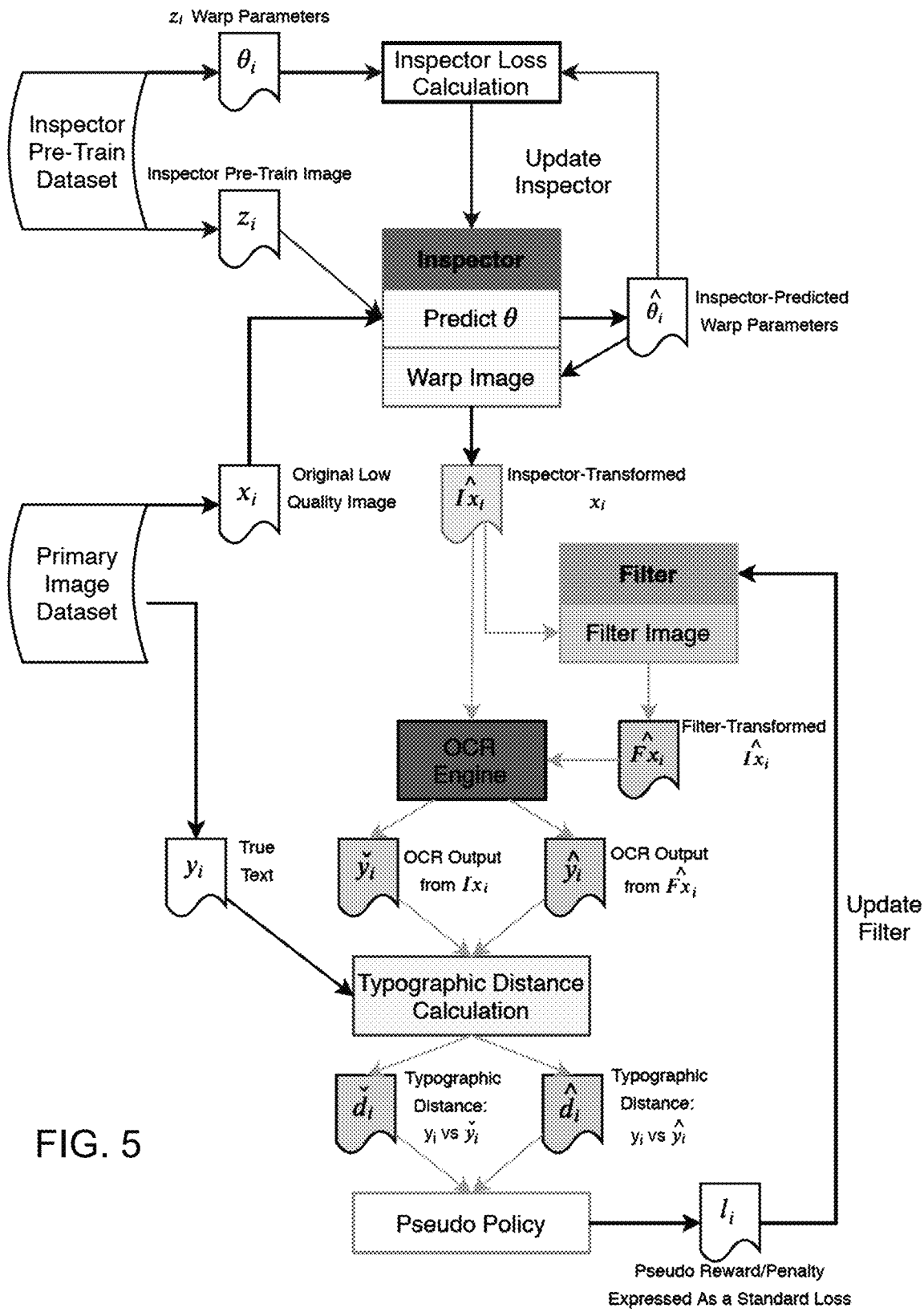
FIG. 5 illustrates a cooperative model combining the inspector and filter sub-models of FIGS. 3 and 4, and illustrates a comparative normalization used to train the filter with respect to improvement of the OCR results on the filtered images relative to OCR results on unfiltered inspector-transformed images.

The inspectors and filters can be trained separately, but must work together to complete the image transformation task. An effective architecture thus integrates both inspectors and filters into a cooperative model, as illustrated in FIG. 5. When inspectors and filters are run in series, order matters. Filtering the inputs to the inspector has little effect on training, but warping the inputs to the filter provides a substantial improvement. The filter makes very little progress on images containing warp distortions, and when run in series with an inspector, the filter does not learn effective transformations until after the inspector has reached near-convergence. Asymmetric learning highlights the importance of pre-training the inspector, then training the filter.

Since the learning task of the inspector is not tied to OCR performance, and is far more structured than the learning task of the filter, it is important to distinguish what improvements were a result of the inspector, and what improvements were a result of the filter. Comparative normalization is still necessary; the OCR performance of the filter-transformed image must be normalized against the OCR performance of the input to the filter. When the inspector and filter are run in series, the input to the filter is not the original image, it is the inspector-transformed image. Therefore, the OCR performance of the filter-transformed image should be normalized against the OCR performance of the inspector-transformed image.

So, with reference to FIG. 5, the inspector sub-model is first pre-trained using an inspector-training dataset comprises a set of generated inspector-training images $z_i$ and a respective set of known warp transformation parameters $\theta_i$ by which known text strings extracted from a set of source images were intentionally distorted, whereby the inspector sub-model is trained to predict a corrective warp-transformation parameter $\hat{\theta}_i$ intended to correct the intentionally applied distortion. In use of the finished cooperative model, once fully trained, the inspector sub-model will thus calculate a predicted corrected warp-transformation parameter $\hat{\theta}_i$ to be applied to an input image of unknown text content destined for the OCR engine via the multi-transform pipeline of the cooperative model. Since the learning task of the inspector is not tied to OCR performance, the inspector-training dataset need not contain text data representative of actual known text content of the training images $z_i$ of that dataset.

On the other hand, for the purpose of training the filter sub-model, a different filter-training dataset (or primary dataset) not only includes a set of filter-training images (or primary images) $x_i$, which optionally may be different from the inspector-training images $z_i$, but also includes primary labels composed of true text string data $y_i$ representative of the actual known text content of the training images $x_i$ of the filter-training dataset. To train the filter sub-model, each filter-training image $x_i$ is first passed to and run through the inspector sub-model, which calculates and applies a predicted corrective warp-transformation parameter $\hat{\theta}_i$ to the filter-training image $x_i$, thereby deriving an inspector-transformed filter-training image $\hat{I}x_i$. One copy of the inspector-transformed filter-training image $\hat{I}x_i$ is passed directly to the OCR engine, bypassing the filter sub-model, and thus remaining "unfiltered". Meanwhile, another copy of this inspector-transformed filter-training image $\hat{I}x_i$ is passed to and run through the filter sub-model, which calculates and applies a convolution kernel to this copy of the inspector-transformed filter-training image $\hat{I}x_i$, thereby deriving a filter-transformed filter-training image $\hat{F}x_i$.

Both the filter-transformed filter-training image $\hat{F}x_i$ and the unfiltered inspector-transformed filter-training image $\hat{I}x_i$ are inputted to the OCR engine, the respective resultant outputs of which are a filter-affected OCR result $\hat{y}_i$ and a comparative filter-unaffected OCR result $\check{\square}_i$. A distance metric calculator receives both of these OCR output results $\hat{y}_i$ and $\check{\square}_i$, and also receives the true text string $y_i$ for the training image $x_i$ concerned, which denotes a targeted ideal OCR result. The distance metric calculator 20 calculates a first distance metric $d(\hat{y}_i; y_i)$ between the filter-affected output result $\hat{y}_i$ and the targeted ideal result $y_i$, and also calculates a comparative second distance metric $d(\check{\square}_i; y_i)$ between the comparative filter-unaffected OCR result $\check{\square}_i$ and the targeted ideal result $y_i$. The first distance metric $d(\hat{y}_i; y_i)$ is then normalized against the comparative second distance metric $d(\check{\square}_i; y_i)$ by calculating the improvement score $d(\check{\square}_i; y_i)-d(\hat{y}_i; y_i)$. The calculated improvement score and first distance metric $d(\hat{y}_i; y_i)$ are together used to categorize the cooperative result of the filter and OCR into one of the five performance outcome categories listed earlier (I0E0, I0E+, I+E0, I+E+, I−E0, I−E+). These performance categories are mapped by the pseudo policy to values usable by a standard loss function li, which is then used to update the filter sub-model.

Figure 12:
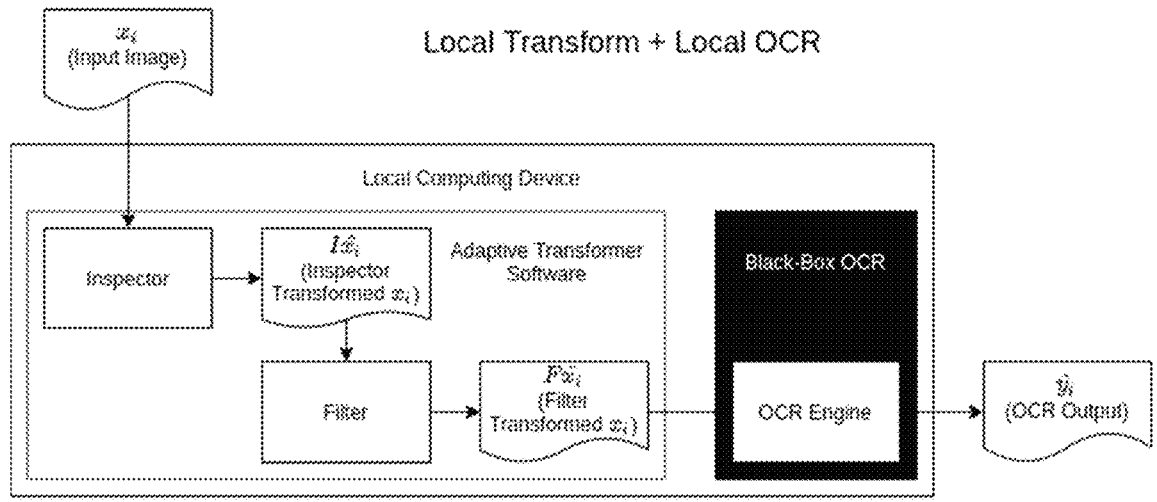
FIG. 12 is a block diagram illustrating a localized system for end-use application of the trained cooperative model from FIG. 5 in the context of a locally executed OCR engine.
Figure 12A:
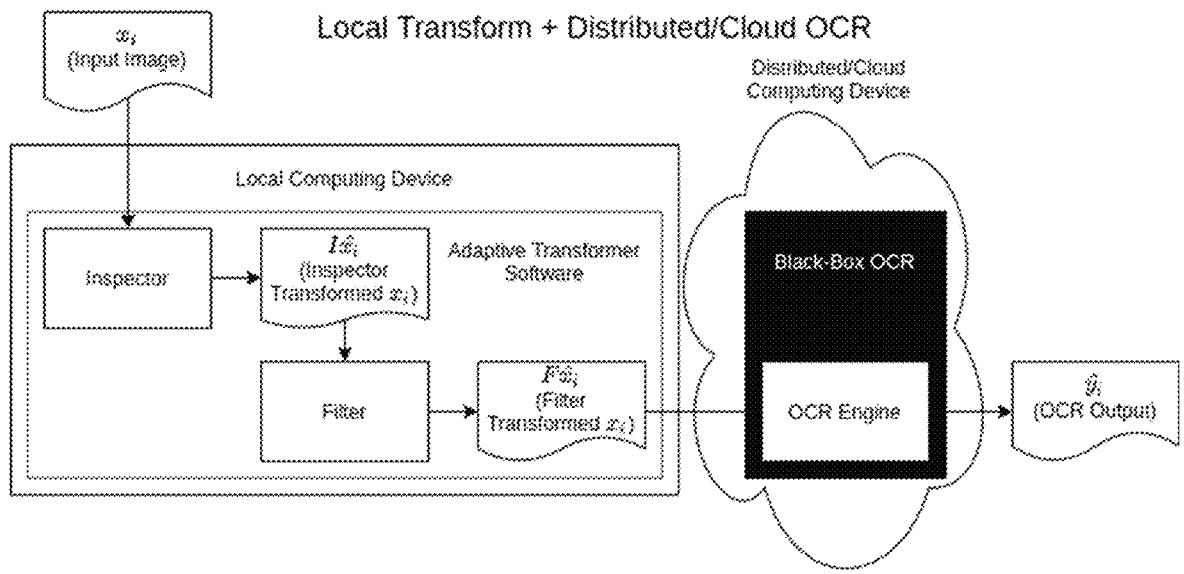
FIG. 12A is a block diagram illustrating a distributed system for end-use application of the trained cooperative model from FIG. 5 in the context of a remotely situated OCR engine.

One both sub-models have been fully trained, they are stored in one or more non-transitory computer readable media together among accompanying computer-executable instructions for execution by one or more computer processors of a computer system composed of at least one computer, or a plurality of networked computers. FIG. 12 shows a localized single-device implementation, where the computer readable memory of the same computing device in which the cooperative model is stored also stores a locally executable OCR engine. FIG. 12A illustrates one example of distributed multi-device implementation, where the cooperative model is stored locally on a single computer, which is connected via the internet or other network to a remotely executed OCR engine hosted by one or more other computers, whether a dedicated server, or a cloud server or other distributed computing system. In another example, not shown, the cooperative model itself may also be distributed among a plurality of computing devices, providing they are communicably interconnected by a suitable communications network to enable passage of data therebetween. The executable instructions enable receipt, or retrieval from memory, of an input image $x_i$ from which a user desires text extraction via OCR, and which, once received or retrieved, is inputted to the inspector sub-model, whose execution then results in calculation of the predicted corrective warping parameter, followed by performance of a warp-transformation on the originally received/retrieved input image using the calculated corrective warping parameter. The resulting inspector-transformed image $\hat{I}x_i$ is then passed as input to the filter sub-model, whose execution derives a convolution kernel, which is then applied to the inspector-transformed image. The resulting filtered image $\hat{F}x_i$ cooperatively transformed by the inspector and filter is then inputted to the separate black-box OCR process for extraction of the text $\hat{y}_i$ from the cooperatively transformed image, and subsequent viewing of the extracted text by a user on a display device, and/or local or remote storing of the extracted text in a usable format in computer readable memory for later retrieval, viewing, printing, etc.

Tested Working Example

Training Data

Figure 6:
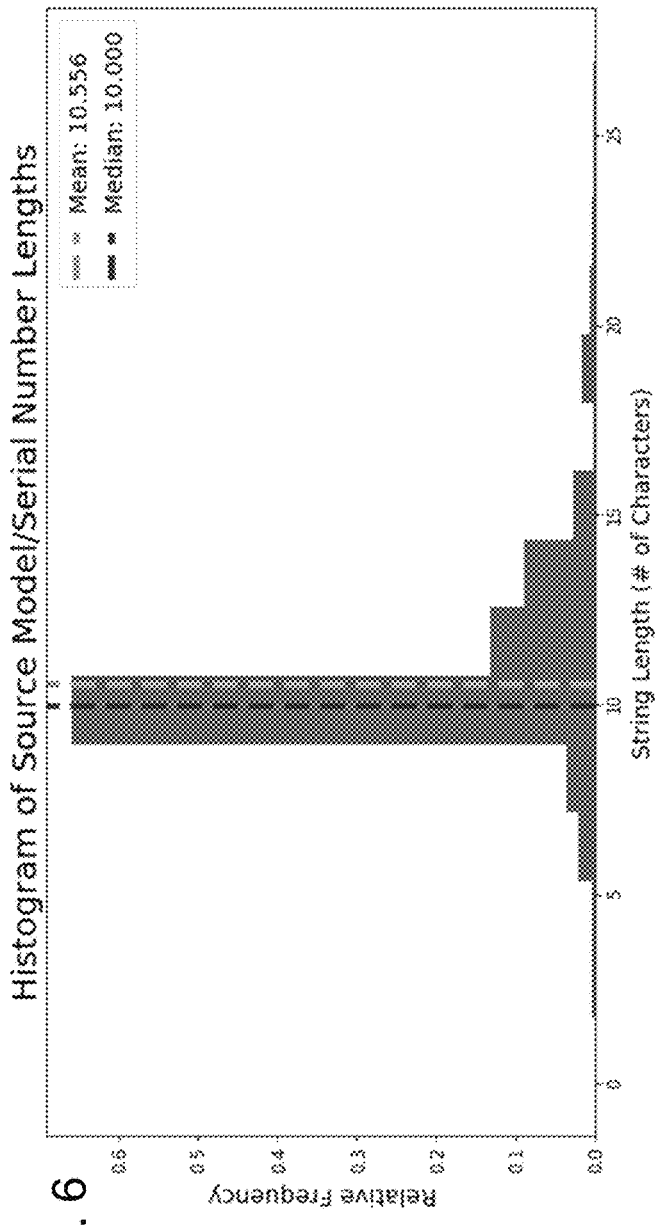
FIG. 6 is a histogram showing the distribution of string length among model/serial number text strings used generate text-containing training images of varying font for training a tested working embodiment of the present invention.

The following example documents the training and testing procedures performed, and the results obtained, during development of the tested working embodiment. In order to eliminate the possibility of a natural language model within the OCR engine improving the extracted text, the training images depict model/serial numbers. Model/serial number corpus was extracted from a set of source images. The model/serial number corpus used for this example contained 7855 unique model and serial numbers. The histograms of FIG. 6 chart the lengths of the unique model/serial number strings used. The median and mode length was 10 characters, but the distribution had a slight positive skew with a mean length of ~10.556 characters.

Tesseract OCR [6] was the OCR engine chosen for this example. Quite simply: Tesseract OCR could be run locally, played nice with other processes, processed images quickly, and was available at no financial expense. The most important factors in the selection process were local computation and speed. Other OCR engines were tried, but they drastically increased the training time. Calls to networked resources, extended output processing/parsing, and resource sharing incompatibilities made other OCR engines less viable for the purposes of prototype development and testing. None of Tesseract's default parameters were changed, and none of the source code was examined to tune the model. The choice of OCR engine was made purely out of time and resource constraints. The results of this example are expected to generalize to other OCR engines since none of the work was tuned for any particular engine.

Figure 7:
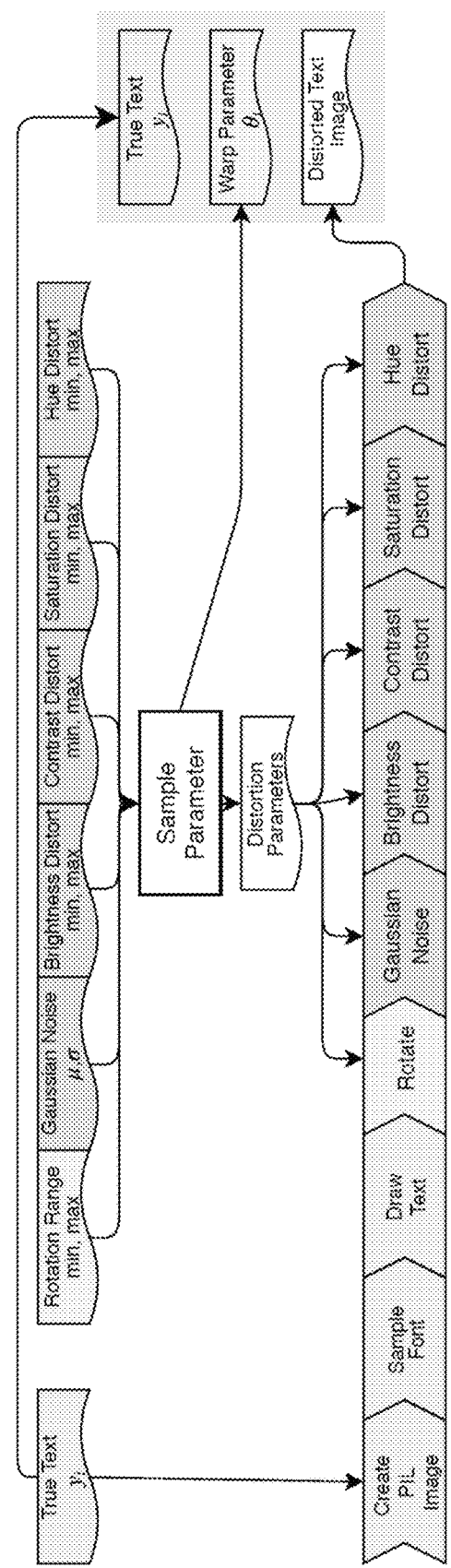
FIG. 7 schematically illustrates intentional distortion applied to the text-containing training images using randomly selected distortion parameters from a specified distribution.

Text images were generated from the source model/serial number strings, with a randomly selected font, then distorted with distortion parameters randomly selected from a specified distribution, as schematically shown in FIG. 7. A collection of 25 fonts were used. This font collection includes serif, sans serif, italic, bold, oblique, mono, and font family combinations thereof. Multiple fonts and font faces were used in order to ensure the model was not specialized to a single font, and was instead trained to work on all major font families. The generated text image was returned with the source text and parameters of warp distortions applied. Each of the distortions applied corresponded to common distortions found in the source image set from which the model/serial numbers were extracted, in this case, captured images of machine dataplates having model and serial numbers thereon. The distortion types and parameter ranges were:

1. Rotate (−20 deg, 20 deg): simulates rotation due to poor capture angle, or as a remnant of perspective correction. In the source images, 95% of images were rotated −20 to 20 degrees, thus the rotation distortion applied is selected from −20 to 20 degrees.
2. Gaussian Noise(0, 0.375): Simulates defects of the text to be captured, the capture environment, and the camera lens. Parameters were chosen as a qualitative assessment of defects seen in source images.
3. Brightness, Contrast, Saturation (0.9, 1.1): Simulates differences in lighting and surface finish. Parameters were chosen as a qualitative assessment of differences seen in source images.
4. Hue (−0.1, 0.1): simulates differences in image sensor, lens coating/filter, and natural color fade. Parameters were chosen as a qualitative assessment of differences seen in source images.

Figure 7A:
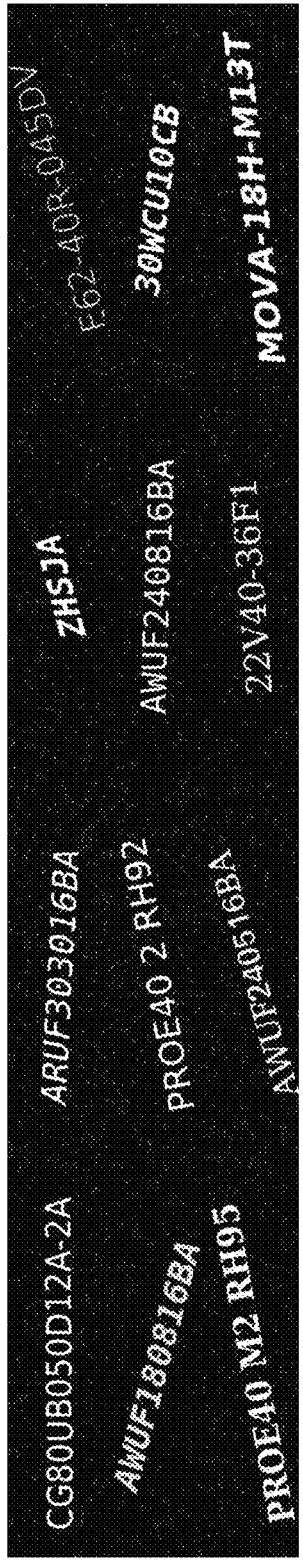
FIG. 7A illustrates a sample subset of the resulting training images.

FIG. 7A shows a small sample of the resulting training images derived from the intentional distortion of the generated text images. During training, a new set of images was generated for each epoch; so although the same model/serial number strings were used between epochs, the manifestation of each model/serial number as an image changed. Thus, each epoch used a novel image set. Note: the sample images shown in the figure were saved in JPEG format and resized for proper document formatting, and high frequency noise was removed. Actual training image tensors were very slightly different.

Figure 8:
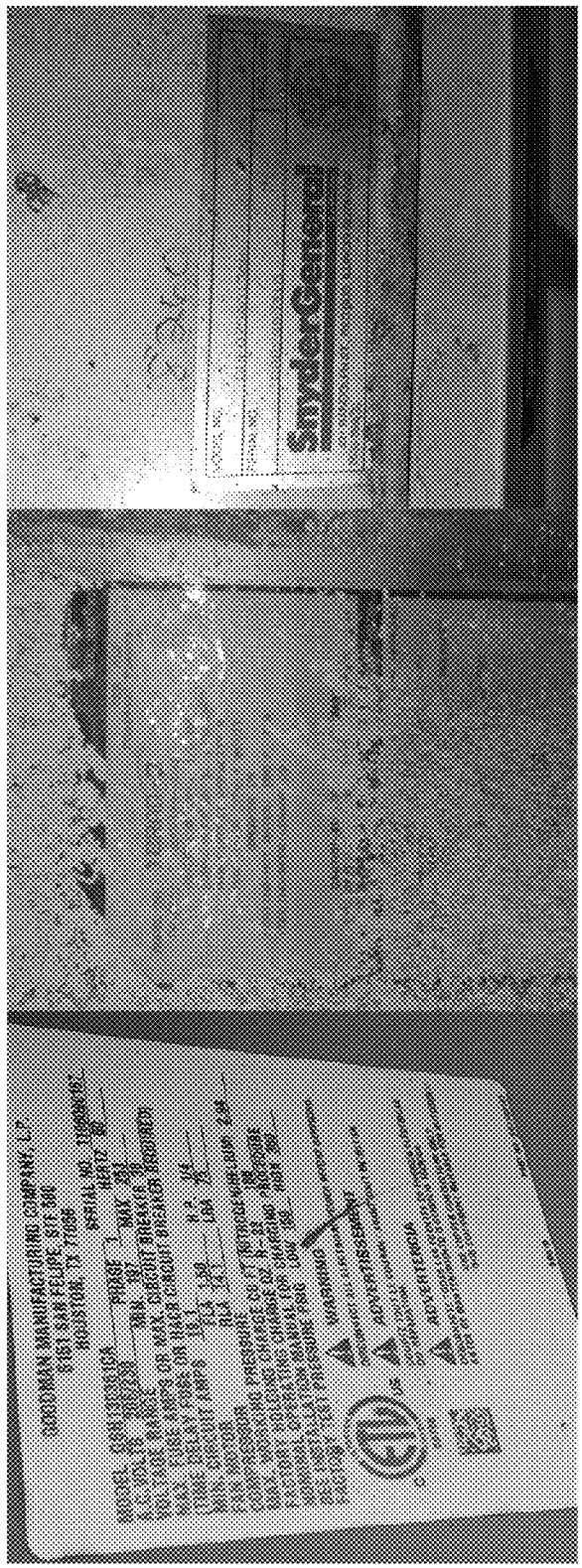
FIG. 8 illustrates a sample subset of source images of machine dataplates from which model/serial numbers were extracted to generate the training images.

The initial image corpus consisted of 15,000+ machine dataplate images. A machine's dataplate is a placard affixed to the machine displaying brand name, product/model/serial number, and information relevant to the installation, maintenance, or certification of the machine. FIG. 8 shows select samples of source machine dataplate images. Though some distortions, occlusions, and perspective problems are present, all three dataplates shown have a legible model and serial number. Model and serial numbers were the primary fields utilized in this example, since many other fields involve natural languages where improvements may be due to language modelling and not image correction.

A ground truth text corpus was built using a three transcriber majority rule through Amazon Mechanical Turk, with random quality control checks for accuracy. Not all fields were legible on every dataplate, and not every image captures a unique dataplate (i.e. some images capture the same plate during different service/inspections, or the same plate from different angles). Using Turker extracted text and other metadata relevant to the image the image and service history of the machine, images of the same plate were used in aggregate to cross-validate and complete the Turker-extracted text. The final ground truth text corpus contained 7855 unique model and serial numbers.

The initial source images were insufficiently constrained for the scope of initial prototyping. The following considerations were tested when preparing the training set:

Image Segmentation By Field
    Exclude extraneous text from edit distance calculation between true text and OCR output of the image. E.g. exclude electrical hazard warnings that are printed near a model/serial number.

Field Stacking
    Stack multiple segments from the same dataplate, or from dataplates of the same style to increase the amount of context provided to the OCR engine.

Image Cropping
    Standardize the size of input images to avoid dynamic changes to the computation graph during training.
    Reduce the size of images (without changing pixel density) in order to reduce computational cost of training.

Perspective Correction
    Utilize close-form four-point perspective transform solutions to correct perspective on off-angle images.

Several tests were conducted on the field captured images, and certain limitations were exhibited, both as a computer vision task and as a Human Intelligence Task (HIT). The results of the tests are as follows:

Image Segmentation By Field
    Computer Vision Based Segmentation:
        Where possible, the corners of field bounding boxes were captured, and the regions contained by the convex hulls of the corners were made into a single field segment. When no bounding/format box was present, pixels were clustered by normalized color and position. The convex hull containing each cluster was made into a field segment. The candidate segments were then run through OCR, and segments that did not contain any text were discarded. Unfortunately, low quality images have very high segmentation error, especially when character recognition based elimination is used. An OCR engine can recognize noise as characters, and fail to recognize true characters. Furthermore, connecting a segment to the appropriate extracted field text is complicated by the fact that there are many more segments than extracted fields. There may be a segment for a non-target field that was correctly identified, but does not match any extracted fields. Further tuning of an image segmentation algorithm is beyond the scope of this research.

HIT Based Segmentation:
        A HIT was created asking the Turker to box a set of target fields. This method solved the problem of linking segment to extracted text, but still presented issues. Namely, not every Turker enclosed the same area or the same content. Some Turkers enclose the field label (e.g. 'MODEL NO:'), some Turkers leave little to no padding around the text, some Turkers slightly clip the text, etc. . . . . Ultimately, HIT based segmentation solved some of the problem present in computer vision based segmentation, but still had many issues. Future research may involve a better HIT environment for the Turkers, or additional preprocessing to simplify the HIT. However, such improvements are beyond the scope of this research.

Field Stacking

Fields that could be successfully segmented were sorted by the type of dataplate from which they were extracted, and then stacked (e.g. all Trane branded condenser unit dataplates from the 1980s have the same font and layout, and thus combinations of field segments from that group were stacked into a single image). Field stacking was limited by the efficacy of field segmentation, and of the stacks that were tested, no significant improvement in OCR accuracy was observed.

Perspective Correction

Computer Vision Based Perspective Correction:

The corners of dataplates were identified using a combination of Harris corner detection and the intersections of Hough lines. Unfortunately, the artifacts present in low quality images made identifying the corners of a dataplate difficult. Since the perspective transform to right a quadrilateral is sensitive to the corners chosen, small errors in corner detection expanded into large errors in post-transform images. Improvements to corner detection are ultimately beyond the scope of this research.

HIT Based Perspective Correction:

A HIT was created asking the Turker to locate the corners of the dataplate present in the image displayed. This worked reasonably well for dataplates with sharp corners, but proved to be more difficult when dataplates had rounded corners. The Hough line intersections used in the computer vision task helped circumvent the problem of rounded corners, but the Turkers struggled to approximate the intersection of dataplate edges. The HIT was edited to ask for Turkers to click the center of the rounded corner (instead of approximating the intersection of edges), but this new HIT did not achieve any improvement in usability of the final data.

Results

'Raw edit distance' describes the non-normalized distance between true text and the image at a particular stage of the transformation pipeline. Raw edit distance does not measure improvement or detriment due to a particular transformation; it represents the OCR performance—not model performance—of a particular stage in the image transformation pipeline. Improvement due to model performance can be calculated by comparing the raw edit distance between transitions in the image transformation pipeline. There are three raw edit distances to consider:

ED1: True Text vs OCR(Original Image) The baseline edit distance before any transformations have been performed.

ED2: True Text vs OCR(Inspector-Transformed Image) The edit distance after corrective warping is applied to the original image by the inspector.

ED3: True Text vs OCR(Inspector→Filter-Transformed Image)
The edit distance after corrective filtering has been applied to the inspector-transformed image by the filter.

Figure 9A:
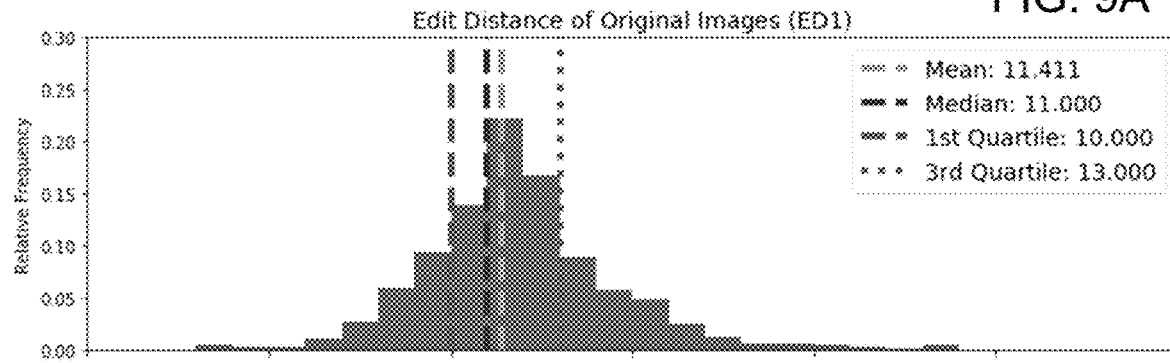
FIGS. 9A through 9C are histogram comparisons of raw edit distance between true text and (a) original images, (b) inspector-transformed images and (c) inspector→filter-transformed images.
Figure 9B:
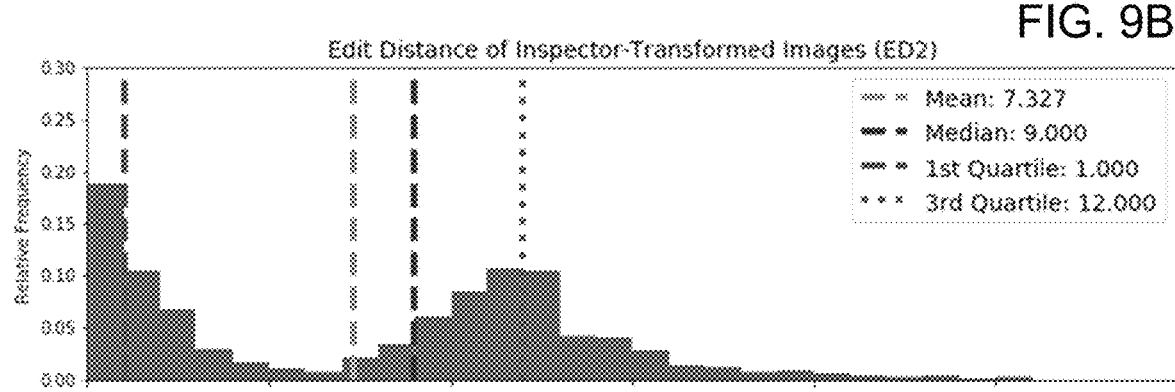
Figure 9C:
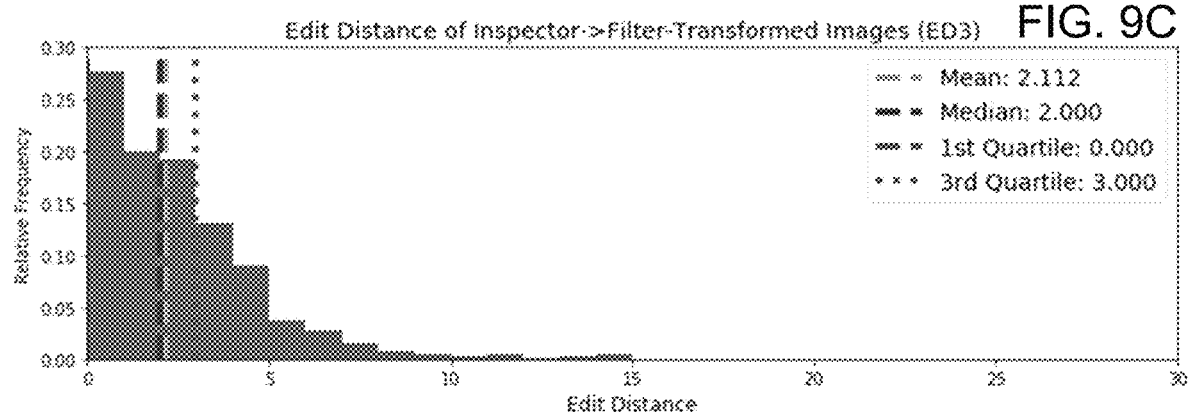

FIG. 9 shows a comparison of raw edit distance between true text and original images, inspector-transformed images, and inspector→filter-transformed images. Histograms plot the results of 1000 sample images selected randomly from the corpus of 7855. Inspector→filter-transformed images are images generated by transforming an original image using the inspector, and then transforming the inspector-transformed image using the filter. Inspector→filter-transformed images represent the complete pipeline of transformations applied by the inspector and filter sub-models. NOTE: The histogram of raw edit distance of inspector-transformed images contains several outliers>100. All 3 histograms share the same x-axis, so the outliers for ED2 are not shown. However, the bin widths have been kept the same to ensure fair comparison.

The distribution for ED1 (FIG. 9A) is centered near the mean length of true text (see FIG. 6 for distribution of true text string length), but has a larger standard deviation. The large mean edit distance, and clustering about the mean edit distance, indicates minimal OCR success; either many incorrect characters were extracted, or few characters were extracted at all. Such a distribution demonstrates a high degree of distortion in the original images. The distribution of ED2 (FIG. 9B) is multi-model with a high and low mode. The high mode is near the third quartile—near the mean of ED1. The low mode is near 0, indicating that some images could be substantially improved through corrective warping by the inspector. The distribution has negative skew (mean<median), but there are several large outliers (beyond the x-range of the histogram). The ED3 distribution (FIG. 9C) is unimodal with a mode of 0, and monotonically decreasing; the high mode of ED2 has been removed. The mean and median are very close, but the distribution still has a very slight positive skew. The inter-quartile range (IQR) of ED3 is equal to that of ED1, but the mean and median are closer and smaller. ED3 is a clear improvement from ED1 and ED2.

Figure 10A:
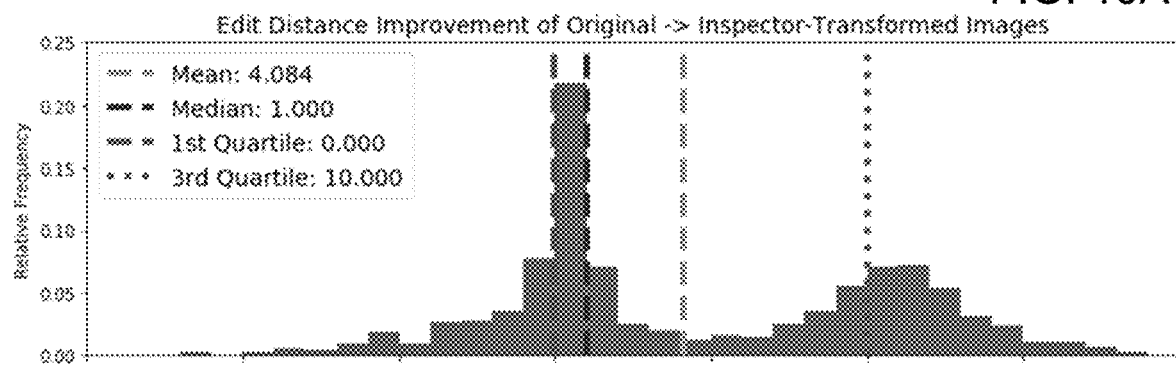
FIGS. 10A through 10C are histograms of edit distance improvement (a) of the original image due to inspector transformations, (b) of the inspector-transformed images due to filter transformations, and (c) of the original image due to transformations applied by the inspector and filter in series.
Figure 10B:
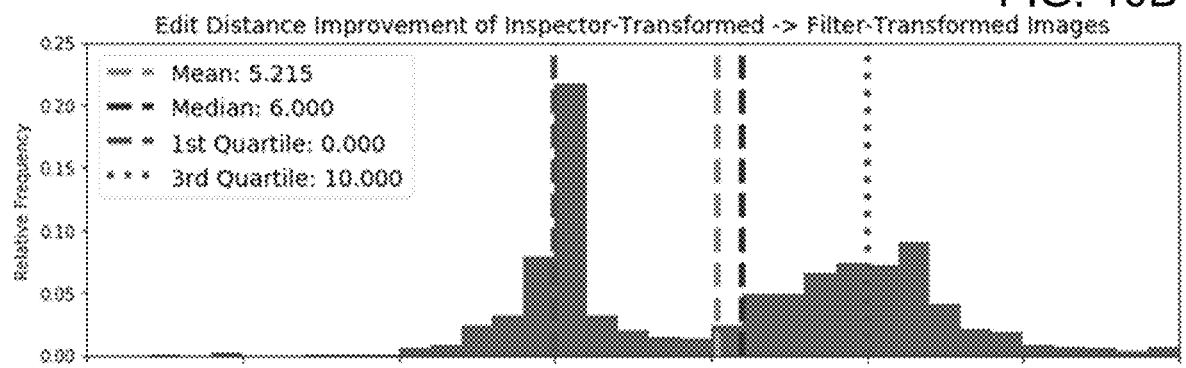
Figure 10C:
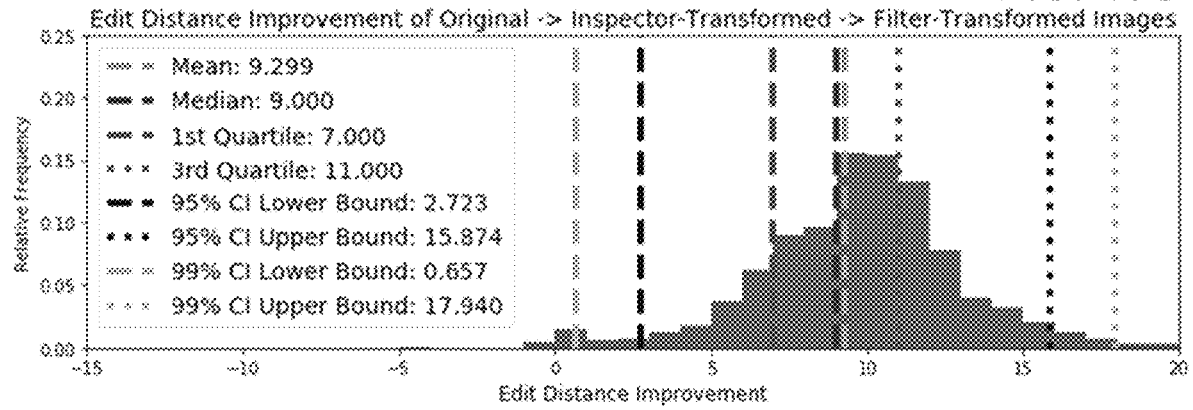

The edit distance improvement score of a transformation (or set of transformations) is the difference between the raw edit distance of the input and output image; the comparative normalized distance. E.g. the improvement score of the inspector is ED1-ED2, which measures the reduction in raw edit distance between the input and output of the inspector, namely, the original images and the inspector-transformed images. FIG. 10 shows edit distance improvements for said 1000 sample images. The first histogram represents the improvement of the original image due to inspector transformations, the second histogram represents the improvement of the inspector-transformed images due to filter transformations, the third histogram represents the improvement of the original image due to the transformation of the inspector and filter used in series. The third histogram represents the total improvement due to the overall image transformer, and bounds for 95% and 99% confidence intervals are shown.

The improvement distributions of the inspector and filter look similar in general shape—equal IQR and bimodal —, but the mean and median improvement of the filter are larger, and the right tail of the filter's improvement distribution is shorter. However, both the inspector and filter have non-zero average improvement, with the filter slightly less likely to have large negative improvement. When used in series, the inspector and filter achieve significant improvement at $\alpha=0.01$, with a distribution centered slightly lower than the mean true text string length; indicating a large proportion of the true text is extracted due to improvement. The tested working embodiment thus provides clearly discernable improvement in the technological field of optical character recognition, where the performance a computer-executed OCR engine is improved by computer-implemented pre-processing of the OCR's input data using separate transformation and filter sub-models that have been trained by machine learning on minimization of a normalized distance metric of the OCR output.

Figure 11:
FIG. 11 shows a sample of images inputted to the OCR engine, and the resulting text string outputted thereby, with each row showing progression from an original input image, to an inspector-transformed image, to a filter-transformed image.

One of the most surprising results was the non-intuitive nature of the transformations and corresponding OCR performance. The cooperative image transformation model of the tested working embodiment learns transformations that improve OCR engine performance, not human legibility; the learned transformations do not match what a human reader would intuitively pick as an improvement, yet produce far better OCR performance. As discussed in the preceding paragraph, a significant (at $\alpha=0.01$) improvement was achieved by the image transformer, and the average final edit distance between true text and transformed image was small. Quantitatively, the effectiveness of the model can be clearly understood; qualitatively, it is difficult for the human eye to distinguish why the learned transformations are so effective. FIG. 11 shows a set of sample images at different stages of the image transformation pipeline paired with the output of Tesseract OCR on the image.

Letting $\mu$ symbolize the mean edit distance improvement due to model transformations, consider an Upper-Tailed Z-test:

$$H_0: \mu = 0$$
$$H_A: \mu > 0$$
$$z = \frac{\mu - 0}{\sigma} \approx \frac{9.299}{3.355} \approx 2.772; \rightarrow p \approx 0.003$$

For $\alpha > 0:003$, $H_0$ may be rejected. With 99.7% confidence, the improvement to edit distance due to model transformations was significant. The image transformer created a significant increase in OCR performance. 95% of images received an edit distance improvement between 2.723 and 15.874, and of 1000 test images, only 6 were made worse.

| Edit Distance | Transformed | Original |
|---|---|---|
| ≤3 | 79.0% | 0.6% |
| ≤2 | 66.1% | 0.1% |
| ≤1 | 47.1% | 0.1% |
| 0 | 27.3% | 0.1% |

As displayed by the table above, over a quarter of the images received perfect correction, and nearly half produced an OCR output within a single edit operation of the true text.

The image transformation model did not make any alterations to the OCR engine used, Tesseract OCR. All parameters were default, and no inspection of Tesseract was performed to tune the model, or adjust the training set. Thereby, the OCR engine was treated as a black-box, and the training regimen generalizes to any other OCR engine. The true text strings from which text images were generated were model/serial numbers; the source text did not follow any natural language, and the OCR engine used, Tesseract, was not adjusted for recognizing strings from non-natural languages. Furthermore, text images were generated using many different fonts and text families; serif, san-serif, mono, oblique, italic, bold, condensed, and combinations thereof. As such, the model was independent of any particular font face. All of the generated text images in the tested working embodiment were a single line of text, though it is anticipated that similar result could be achieved with multi-line extraction and advanced mathematical typesetting. To the extent that advanced typesetting and symbolism is tested, further experimentation could be conducted on different alphabets and phoning marks. A natural extension of the testing working example would be to generate text images of typeset math. This would preserve language independence, but allow for testing multi-line text and less trivial character relationships.

The teachings of the present invention may be applied to less constrained images than the particular examples disclosed above in relation to the tested working embodiment. In one non-limiting example of a further embodiment, an additional "detective" sub-model could be added in upstream relation to the "inspector" and "filter" sub-models of the illustrated embodiment, and could be trained to perform additional preprocessing tasks on very poorly constrained images. The detective could assemble a 'dossier' on the image detailing the bounding boxes of target fields, text orientation, and segmentation/crop parameters. The detective could be trained to prepare poorly constrained images for input to the inspector. It will therefore be appreciated that the input image to the inspector need not necessarily be a raw input image in its originally captured or received form.

Not all images will benefit from both warping and filtering transformations. Although the inspector and filter could theoretically learn a no-op for such images, it may be more efficient to include a 'valve' network that directs images to the appropriate sub-models. The valve network could learn both order and exclusion—the order in which the sub-models are applied, and what sub-models are used. Such a valve network may provide a similar efficiency gain as that introduced by the separation of warping and filtering; the valve network offloads part of the warping and filtering task to a specialized sub-model.

Other Use Cases

Figure 13:
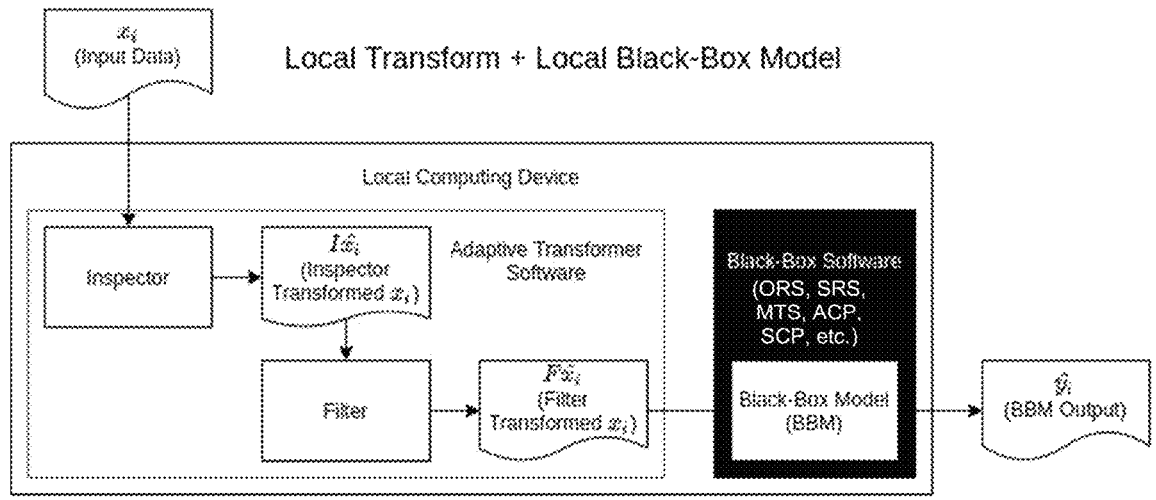
FIGS. 13 and 13A are block diagrams similar to FIGS. 12 and 12A, respectively, but illustrating compatibility of the cooperative model with a variety of non-OCR applications.
Figure 13A:
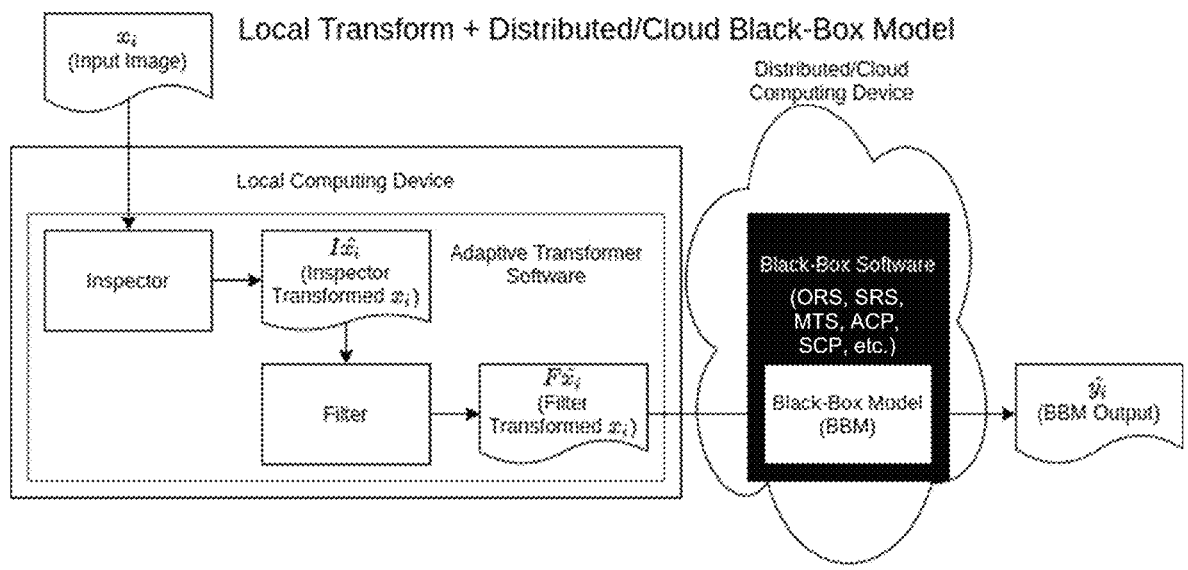
Figure 14:
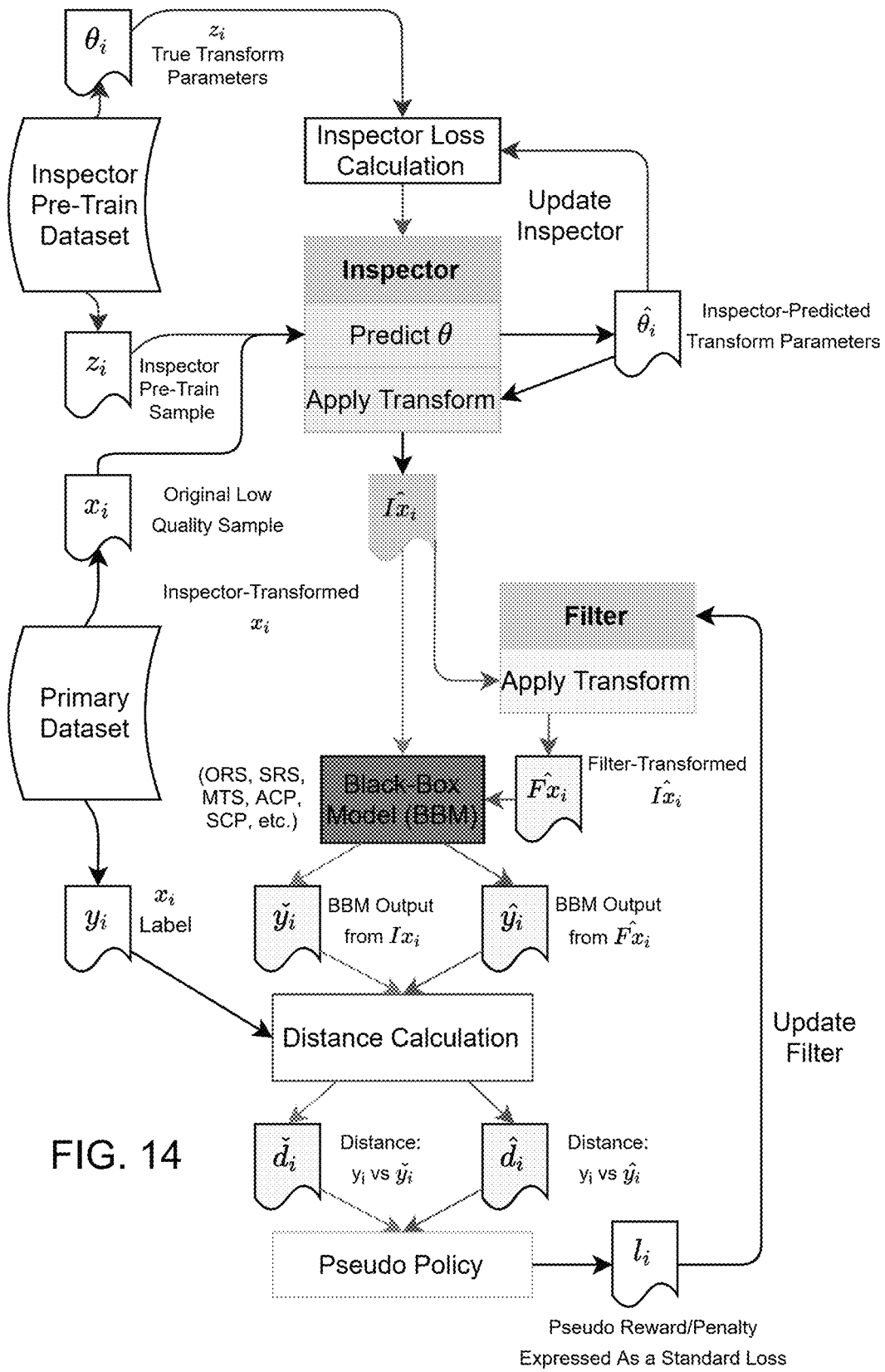
FIG. 14 is similar to FIG. 5, but illustrates how the same training process can be applied for a variety of non-OCR applications, like those contemplated in FIGS. 13 and 13A.

It will be appreciated that application of the forgoing operating components and principles of the present invention is not limited specifically to OCR; the input/output of any other optical recognition model could be used in place of an OCR engine, and gain similar benefit from the novel aspects of the cooperative model and associated training methodologies disclosed herein. In each case, while the specific type of data concerned may vary from one example to another, the training process follows the same general workflow shown in FIGS. 5 and 14, and the end-use application likewise follows the same general workflow shown in FIGS. 12 and 13.

Object Recognition/Classification

In the case of optical classification tasks, the OCR engine could be substituted with a classifier, and the pseudo-policy could be replaced with a classifier evaluation metric—e.g. F1, precision, recall. So training images, instead of captured imagery of containing known text content, would be captured imagery containing objects of known types, against which the classifier evaluation metric would evaluate generated classification labels of objects detected by the classifier, with the above described comparative normalization being used between the inspector-transformed images and the original images during training of the inspector, and being used between the inspector→filter-transformed images and the inspector-transformed images during training of the filter, optionally using different training images from those used to train the inspector.

In this example, the inspector pre-training data (z) would be images containing a target object and any surrounding objects. The inspector pre-training labels (θ) applied to this pre-training data would be corrective warp parameters (e.g. angle of rotation, perspective transform homography, etc. ...) and/or bounding contour of the target object. The primary/filter-training data (x) would be Images containing the target object and any surrounding objects, and the primary labels (y) would be the known class label for the target object. As with the OCR example, the inspector pre-training image data and the primary/filter-training image data can optionally be the same, as long as the appropriate labels for the two distinct training tasks are provided, or the two datasets can contain different image data. The inspector can be trained more generally to isolate the foreground/background and perform corrective warping.

The cooperative inspector-filter model can be trained upstream of any object recognition process, for example in black-box relation to existing off-the-shelf object recognition software (e.g. Google Lens, Amazon Rekognition, IBM Watson Visual Recognition, etc.). The inspectors learn corrective warping (much like the inspector in the OCR example) and or image segmentation. For example, the inspector could learn general corrective warping and object/background segmentation. The filter sub-models could learn to filter the inspector-transformed image to improve object recognition. The filters are updated using comparative normalization of the cross-entropy improvement between the transcript of the inspector-transformed image and the filter-transformed image. One of these filtering operations could be to increase the contrast between phonemes. Referring to the object recognition software as ORS for brevity, the filter-affected ORS result $\hat{y}_i$ would be a resultant classification output of the ORS based on the filter-transformed image $\hat{F}x_i$, and the comparative filter-unaffected ORS result $\check{y}_i$ would be a resultant classification output of the ORS based on the inspector-transformed image $\hat{I}x_i$.

In end-use application, the trained cooperative model is run on captured images before being passed to black-box ORS. For example, an image is captured, corrective warping is applied and the foreground is segmented from the background by the inspector. The warped foreground segment is filtered by the filter, and then passed to ORS to classify the foreground object. To demonstrate a specific non-limiting example of use, consider that a customer captures an image of an unknown vegetable at the grocery store. Before the cooperative model can be used together with ORS to perform optimized object recognition on that image, the inspector is first pre-trained to apply corrective warping and segment foreground/background on a general image set. The filter is trained using labeled images of vegetables, and updated by comparative normalization of cross-entropy improvement in ORS generated classification labels derived from the inspector-transformed image and filter-transformed image. During end use of the trained model on the grocery customer's captured image, the inspector applies corrective warping and segments the vegetable in the customer's hand (the foreground) from the vegetables on the shelf (the background). Then the foreground segment is filtered by the filter, and the filtered image is passed to black-box ORS for classification.

Application of the cooperative model is also not particularly limited to optical analysis of image data, and may be applied to pre-optimize other types of input data for other categories of computer-implemented analysis. Other examples include applications where timeseries data, rather than image data, is the input.

Speech Recognition

In the technological field of audio processing, one such example would be speech recognition, where the training data is timeseries audio data derived from captured audio containing known spoken words against which the distance metric of detected words by the speech recognition process can be taken during the comparative normalization steps.

In this example, the inspector pre-training data (z) would be captured audio tracks containing the speaking voice of a particular target speaker whose voice the model is being trained to recognize, along with the speaking voice of one or more other nearby speakers and/or other background noise. The inspector pre-training labels (θ) applied to this pre-training data would be time warping parameters of audio tracks containing the target speaker's voice in isolation. The primary/filter-training data (x) would be raw audio containing the speech of the target speaker, along with speech of other nearby speakers and/or background noise, and the primary labels (y) would be text transcripts of the targeted speaker's recorded speech in that raw audio. The inspector pre-training audio data and the primary/filter-training audio data can optionally be the same, as long as the appropriate labels for the two distinct training tasks are provided, or the two datasets can contain different audio data from one another. The inspector can be trained more generally to isolate the voice of the target speaker.

The cooperative inspector-filter model can be trained upstream of any speech recognition process, for example in black-box relation to existing off-the-shelf speech recognition software (e.g. Nuance Dragon, Apple Siri, Microsoft Cortana, etc.). The inspectors learn speaker recognition and speech normalization (independent of speech recognition) to isolate and normalize the voice of the target speaker. For example, the inspector could learn dynamic time warping to model a target speaker's voice, and normalize the cadence to a standard form. The filter sub-models could learn to filter the inspector-transformed audio track to improve speech recognition. Referring to the speech recognition software as SRS for brevity, the filters could be updated using comparative normalization of the edit distance improvement between the SRS resultant transcript of the inspector-transformed audio and the filter-transformed audio. So, the filter-affected SRS result $\hat{y}_i$ would be a resultant text transcript outputted by the SRS based on the filter-transformed audio $\hat{F}x_i$, and the comparative filter-unaffected SRS result $\check{y}_i$ would be a resultant text transcript outputted by the SRS based on the inspector-transformed audio $\hat{I}x_i$.

In end-use application, the trained cooperative model is run on captured audio before being passed to the black-box SRS. For example, an audio track is captured, the target speaker's voice is isolated and normalized by the inspector. The isolated target speaker audio is then filtered by the filter, and finally passed to the SRS to produce a transcript of the audio, which then may be put to any variety of uses (saved for later retrieval, displayed in real time, transmitted elsewhere, scanned for keywords, etc.). To demonstrate a specific non-limiting example of use, consider that a politician or other orator giving a speech at a public venue is recorded, and the recorded audio contains the politician's speech, as well as voices among the crowd and various background noise. Before the cooperative model can be used together with SRS to perform optimized transcription of that speech, the inspector is pre-trained to isolate and normalize the politician's voice using prior radio/TV interviews in which the politician's voice is isolated. Transcripts of those interviews released by the politician's staff and attending journalists are used as true text labels when measuring edit distance between true text and the text transcript output by the SRS. The filter is trained using the comparative normalization of the edit distance improvement between the text transcript from the inspector-transformed audio and the text transcript from the filter-transformed audio. During end use of the trained model on the recorded audio of the politician's speech (i.e. in the intended input to the SRS), the inspector first isolates and normalizes the target speaker's speech, after which the filter then filters the speech and passes it on to the black-box SRS to produce a transcript of the speech.

Motion Tracking Analysis

One non-limiting example in this category of end use for the cooperative model of the present invention is analyzing the signal feeds of exercise/health equipment that tracks the motion of the human body to improve form/therapeutic benefit of an exercise. In this example, the inspector pre-training data (z) would be timeseries data representing the acceleration/position of motion tracking components of the equipment. The inspector pre-training labels ($\theta$) applied to this pre-training data would be time warp and scale parameters of the signal feeds from the motion tracking components. The primary/filter-training data (x) would be timeseries data representing the acceleration/position of motion tracking components, and the primary labels (y) would be classification labels denoting relative correctness of motion. The inspector pre-training timeseries data and the primary/filter-training timeseries data can optionally be the same, as long as the appropriate labels for the two distinct training tasks are provided, or the two datasets can contain different timeseries data from one another. The inspector can be trained more generally to approximate the transforms necessary for the particular morphology of the human subject.

The cooperative inspector-filter model can be trained upstream of any motion tracking system, for example in black-box relation to existing off-the-shelf motion tracking software, referred to herein as MTS for short. The inspectors learn time warping of the feeds of the motion tracking components. For an MTS that analyzes exercise form (EFMTS), differences in body morphology create differences in motion independent of the correctness of form (e.g. shorter arms trace a shorter arc when swung). The inspector can be pre-trained using general motion tracking data from the subject. In this example of exercise form analysis, the filter sub-models learn to filter the inspector-transformed timeseries to improve form failure recognition. One of these filtering operations could be to remove noise from the motion capture, or remove superfluous movements not related to form. The filters are updated using comparative normalization of the cross-entropy improvement of form error detection. So, the filter-affected EFMTS result $\hat{y}_i$ would be a form correctness classification output of the black-box EFMTS given the filter-transformed timeseries $\hat{F}x_i$, and the comparative filter-unaffected EFMTS result $\breve{y}_i$ would be a form correctness classification output of the black-box EFMTS given the inspector-transformed timeseries $\hat{I}x_i$.

In end-use application, the trained cooperative model is run on captured motion data before being passed to black-box EFMTS. For example, motion data is captured by the equipment, to which time warping and motion scaling are applied by the inspector. The warped timeseries is filtered by the filter, and then passed to EFMTS to classify the correctness of motion. To demonstrate a specific non-limiting example of use, consider a patient of a physical therapist who uses motion tracking equipment to identify errors in the patient's exercise form. Before the cooperative model can be used together with EFMTS to optimize the results thereof, the inspector is first pre-trained using the general motion and morphology of the patient. The filter is trained by comparative normalization of cross entropy improvement in black-box exercise form classification software between the inspector-transformed timeseries and the filter-transformed timeseries (using a set of motions labeled by the physical therapist for correctness of form). During end use of the trained model, the patient's motion is captured, warped by the inspector, then filtered by the filter, and passed to the physical therapist's EFMTS to be classified by correctness of form.

Other Timeseries Applications

In the technological field of medical diagnostic equipment, a computer-implemented arrhythmia classification process (ACP) receiving timeseries electrocardiogram data as its input can benefit from pre-optimization of this input data by the cooperative model when having been trained on electrocardiogram data of cardiological patients of previously diagnosed arrhythmia type. In the technological field of radar/sonar signal processing, another application example involving timeseries data is a radar/sonar signature classification process (SCP), which receives radar/sonar timeseries data as its input, and can benefit from pre-optimization of this input data by the cooperative model when having been trained on radar/sonar signature data of known objects. From these non-limiting examples, it will be appreciated that the disclosed cooperative transformation model has potential for broad application to a variety of recognition/perception tasks.

Since various modifications can be made in my invention as herein above described, and many apparently widely different embodiments of same made, it is intended that all matter contained in the accompanying specification shall be interpreted as illustrative only and not in a limiting sense.

REFERENCES

[1] Bassil, Youssef, and Mohammad Alwani. Ocr post-processing error correction algorithm using google online spelling suggestion. Journal of Emerging Trends in Computing and Information Sciences, 3(1), 2012.

[2] Beitzel, Steven M., Eric C. Jensen, and David A. Grossman. Retrieving ocr text: A survey of current approaches. 2003.

[3] W. Bieniecki, S. Grabowski, and W. Rozenberg. Image preprocessing for improving ocr accuracy. In 2007 International Conference on Perspective Technologies and Methods in MEMS Design, pages 75-80. IEEE, 2007.

[4] Cormen and Thomas H. et al. Introduction to algorithms. MIT press, 3rd edition, 2009.

[5] Dengel and Andreas et al. Techniques for improving ocr results. pages 227-258, 1997.

[6] Ray. Smith. An overview of the tesseract ocr engine.

[7] Xiang Tong and David A. Evans. A statistical approach to automatic ocr error correction in context. 1996.

[8] Wick, Michael, M. Ross, and E. Learned-Miller. Context-sensitive error correction: Using topic models to improve ocr. In Ninth International Conference on Document Analysis and Recognition (ICDAR 2007), volume 2. IEEE, 2007.

[9] Yujian, Li, and Liu Bo. A normalized levenshtein distance metric. IEEE transactions on pattern analysis and machine intelligence, 29:1091-1095, 2007.

The invention claimed is:

1. A system for computer-implemented pre-optimization of input data before further processing thereof by a computer-implemented analyzation process, said system comprising:

one or more non-transitory computer readable media having embodied therein computer executable instructions for execution by one or more computer processors connected to said one or more non-transitory computer readable media to perform the following operations:

provide said input data as input to one or more supervised-learning based inspector sub-models that have been trained to calculate one or more predicted transformation parameters for one or more transformations to be applied to said input data, and, through execution of said one or more supervised-learning based inspector sub-models, acquiring said one or more predicted transformation parameters;

trigger execution of said one or more transformations on said input data using said one or more predicted transformation parameters acquired from said one or more inspector sub-models, thereby deriving inspector-transformed input data;

provide said inspector-transformed input data as input to one or more filter sub-models that have been trained to derive one or more convolution kernels to be applied to said inspector-transformed input data, and, through execution of said one or more filtering sub-models, acquiring said one or more convolution kernels; and trigger application of one or more convolution kernels to the inspector-transformed input data, thereby deriving inspector-and-filter-transformed input data for input to said computer-implemented analyzation process to improve resultant performance thereof.

2. The system of claim 1 wherein said computer-executable instructions are configured to operate in black-box relation to said computer-implemented analyzation process by passing only said filter-transformed input data to said computer-implemented analyzation process, without any process-altering modifiers that may otherwise influence, modify or customize operational details of said computer-implemented analyzation process.

3. A computer-implemented method for pre-optimizing input data before further processing thereof by a computer-implemented analyzation process, said method comprising:

by a computing system comprising one or more computer processors and one or more non-transitory computer readable media storing thereon statements and instructions executable by said one or more computer processors:

receiving said input data;

providing said input data as input to one or more supervised-learning based sub-models that have been trained to calculate one or more predicted transformation parameters for one or more transformations to be applied to said input data;

executing said one or more supervised-learning based inspector sub-models, and thereby calculating said one or more predicted transformation parameters;

performing said one or more transformations to said input data using said one or more predicted transformation parameters calculated by said one or more supervised-learning based inspector sub-models, and thereby deriving inspector-transformed input data;

providing said inspector-transformed input data as input to one or more filter sub-models that have been trained to each derive a respective convolution kernel to be applied to said inspector-transformed input data; and filtering the inspector-transformed input data using the respective convolution kernels derived by the one or more filter sub-models, thereby deriving filter-transformed input data for input to said computer-implemented analyzation process to improve resultant performance thereof.

4. The method of claim 3 comprising maintaining a black-box relationship between the sub-models and the computer-implemented analyzation process, including, after deriving said filter-transformed input data, passing only said filter-transformed input data to said computer-implemented analyzation process, without any process-altering modifiers that may otherwise influence, modify or customize said computer-implemented analyzation process.

5. The method of claim 3 wherein said input data comprises image data representing captured imagery, and said computer-implemented analyzation process is an optical character recognition process configured to extract text from said captured imagery.

6. The method of claim 3 wherein said input data comprises image data representing captured imagery, and said computer-implemented analyzation process is an object recognition process configured to identify objects within said captured imagery.

7. The method of claim 3 wherein said input data comprises timeseries audio data representing captured audio, and said computer-implemented analyzation process is an audio analysis process.

8. The method of claim 7 wherein said audio analysis process is a speech recognition process.

9. The method of claim 3 wherein said input data is timeseries electrocardiogram data, and said computer-implemented analyzation process is an arrhythmia classification process.

10. The method of claim 3 wherein said input data is timeseries radar/sonar data, and said computer-implemented analyzation process is a radar/sonar signature classification process.

11. A method of training the sub-models of the system recited in claim 1, said method comprising training the one or more inspector sub-models using a first set of training data, and training the one or more filter sub-models using a second set of training data that is distinct from said first set of training data.

12. The method of claim 11 wherein the first set of training data includes known ideal transformation parameters that would result in ideal transformation of the training data if used thereon in said one or more transformations, and said second set of training data lacks said ideal transformation parameters from the first set of training data.

13. A method of training one or more inspector sub-models and one or more filter sub-models of a system for computer-implemented pre-optimization of input data before further processing thereof by a computer-implemented analyzation process, said method comprising:

running filter-training data through the one or more inspector sub-models to derive inspector-transformed filter-training data;

running said inspector-transformed filter-training data through the one or more filter sub-models, thereby deriving filter-transformed filter-training data;

inputting both said filter-transformed filter-training data and said inspector-transformed filter-training data to said computer-implemented analyzation process, and deriving therefrom filter-affected resultant data derived from the filter-transformed filter-training data and comparative filter-unaffected resultant data derived from the inspector-transformed filter-training data;

calculating:
- a first distance metric between said filter-affected resultant data and targeted resultant data that is representative of an ideal outcome of the further computer implemented analysis; and
- a second distance metric between said comparative filter-unaffected resultant data and said targeted resultant data; and normalizing said first distance metric against said second distance metric, and based at least partly thereon, assessing performance of the one or more filter sub-models, and updating said one or more filter sub-models based on an assessed performance thereof.

14. The method claim 13 wherein said filter-training data comprises image data representing captured imagery, said computer-implemented analyzation process is an optical character recognition process configured to extract text from said captured imagery, said filter-affected and filter-unaffected resultant data are text strings extracted by said optical character recognition process, and said targeted resultant data comprises targeted text strings representing known actual text found in said text-containing imagery.

15. The method claim 13 wherein said filter-training data comprises image data representing captured imagery, said computer-implemented analyzation process is an object recognition process configured to identify objects within said captured imagery, said filter-affected and filter-unaffected resultant data are predicted object classification labels derived by said object recognition process, and said targeted resultant data comprises known object classification labels of actual objects in said captured imagery.

16. The method claim 13 wherein said filter-training data comprises timeseries audio data representing captured audio, said computer-implemented analyzation process is a speech recognition process configured to detect spoken words from said captured audio, said filter-affected and filter-unaffected resultant data are text strings of detected words from said captured audio, and said targeted resultant data comprises targeted text strings representing known actual spoken words from said captured audio.

17. The method claim 13 wherein said input data is timeseries electrocardiogram data, said computer-implemented analyzation process is an arrhythmia classification process, said filter-affected and filter-unaffected resultant data are predicted arrhythmia classification labels derived by said arrhythmia classification process, and said targeted resultant data comprises known arrhythmia classification labels of cardiological patients from whose electrocardiograms said time series electrocardiogram data was derived.

18. The method of claim 13 wherein said input data is timeseries radar/sonar data, said computer-implemented analyzation process is a radar/sonar signature classification process, said targeted resultant data are predicted object classification labels derived by said radar/sonar signature classification process, and said targeted resultant data comprises known object classification labels of actual objects from whose radar signatures said time series radar/sonar data was derived.

19. The system of claim 1 wherein said one or more transformations are warping transformations.

20. The method of claim 3 wherein said one or more transformations are warping transformations.

* * * * *